(12) United States Patent
Fukuda

(10) Patent No.: US 6,628,596 B2
(45) Date of Patent: *Sep. 30, 2003

(54) MULTI-VALUED DATA ELEMENTS FOR COMPUTER SYSTEMS

(75) Inventor: Hirosi Fukuda, Sunny Hill A-201, 1175-1, Higashi-araicho, Tokorozawa, Saitama-ken 359-0034 (JP)

(73) Assignee: Hirosi Fukuda, Saitama-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/041,891

(22) Filed: Oct. 19, 2001

(65) Prior Publication Data

US 2002/0097652 A1 Jul. 25, 2002

Related U.S. Application Data

(63) Continuation-in-part of application No. 09/402,006, filed as application No. PCT/JP98/01213 on Mar. 20, 1999, now Pat. No. 6,324,143.

(30) Foreign Application Priority Data

| Jan. 27, 1997 | (JP) | ................................................ | 9-46844 |
| Mar. 12, 1997 | (JP) | ................................................ | 9-63696 |
| Mar. 25, 1997 | (JP) | ................................................ | 9-110005 |

(51) Int. Cl.$^7$ ................................................ G11B 5/76
(52) U.S. Cl. ................................................ 369/59.24; 369/59.11
(58) Field of Search ................................................ 369/47.15, 47.16, 369/47.5, 47.51, 59.11, 59.17, 59.23, 59.24, 59.25, 116, 124.01, 275.3, 59.12

(56) References Cited

U.S. PATENT DOCUMENTS 3,699,567 A    10/1972   Kiyasu et al.
5,784,409 A  *  7/1998   Coles ........................ 375/286
6,324,143 B1 * 11/2001   Fukuda .................... 369/59.11

FOREIGN PATENT DOCUMENTS

| JP | 30-4816 | 7/1955 |
| JP | 51-24842 | 8/1974 |
| JP | 54-162920 | 12/1979 |
| JP | 56-161743 | 12/1981 |
| JP | 57-136845 | 8/1982 |
| JP | 62-48154 | 3/1987 |
| JP | 63-122335 | 5/1988 |
| JP | 64-39854 | 2/1989 |
| JP | 2-79595 | 3/1990 |
| JP | 2-218243 | 8/1990 |
| JP | 03-159439 | 9/1991 |
| JP | 5-266482 | 10/1993 |
| JP | 6-22372 | 1/1994 |
| JP | 6-37816 | 2/1994 |
| JP | 6-282943 | 10/1994 |
| JP | 7-131495 | 5/1995 |

* cited by examiner

*Primary Examiner*—Paul W. Huber
(74) *Attorney, Agent, or Firm*—Taiyo, Nakajima & Kato

(57) ABSTRACT

This invention resolves the limitations of the binary data encoding and storage system by encoding multi-valued meaning to data elements prior to the recording and storing of these multi-valued data elements based on a plurality of quantities in a memory point. In order to make a single memory point suitable to record multi-valued data elements, where each value has a special meaning in a particular recording, quantities of magnetism or light, like its intensity, shape, etc., are digitized or analogized so that each of the quantities can be recorded and extracted. The invention additionally includes systems and methods for using multi-valued data elements, including wireless transmission.

15 Claims, 33 Drawing Sheets

F I G. 1
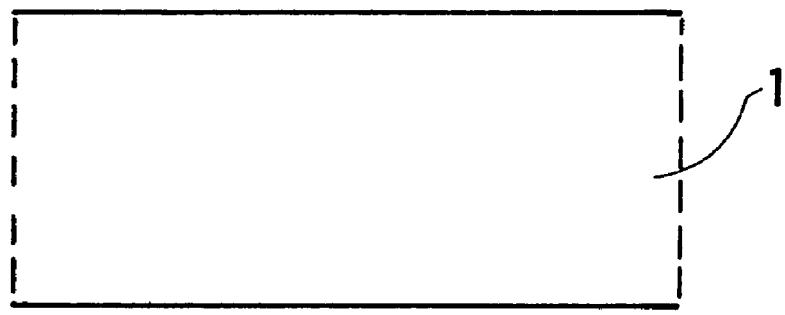
F I G. 2
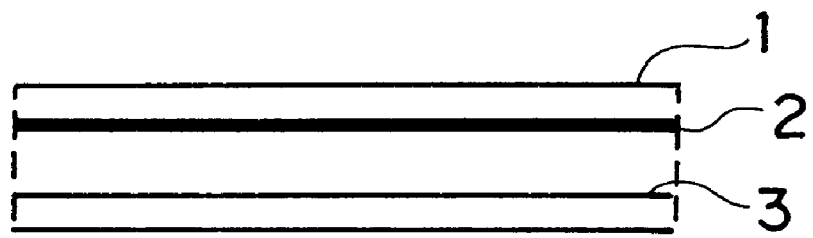

F I G. 6
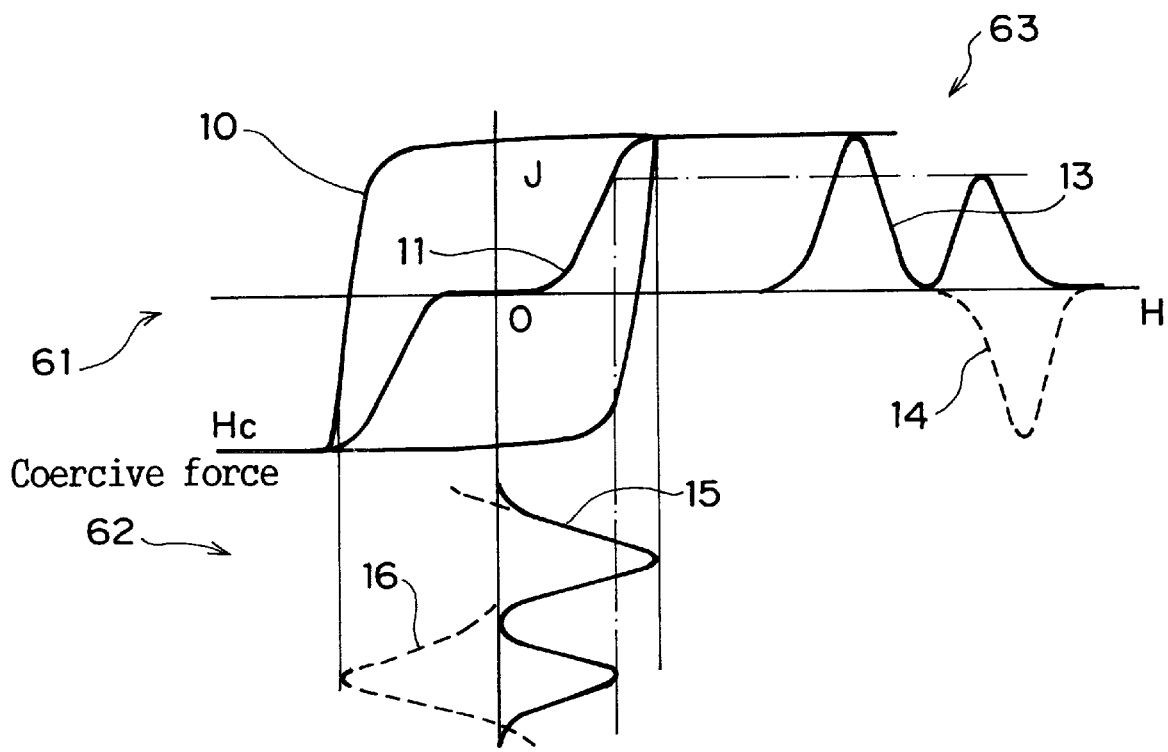

F I G. 1 0
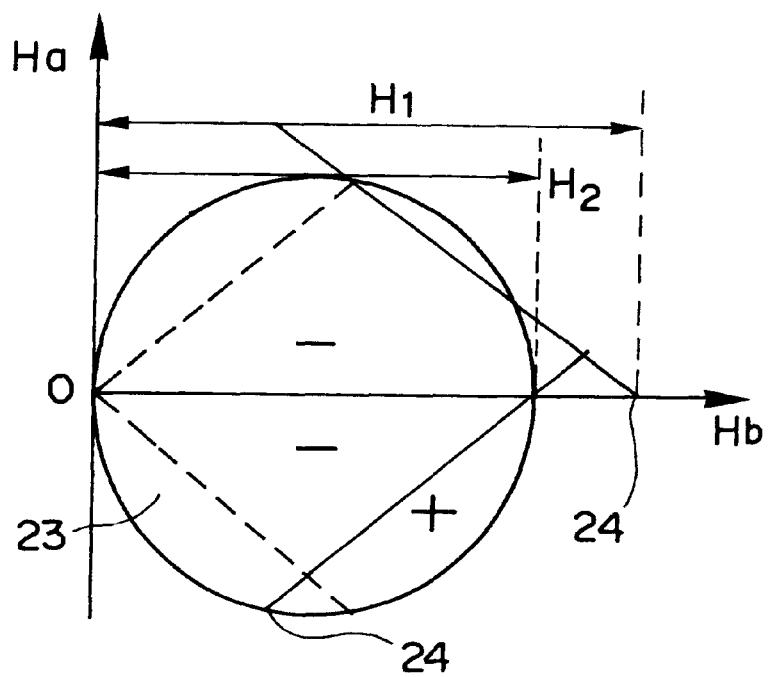
F I G. 1 1
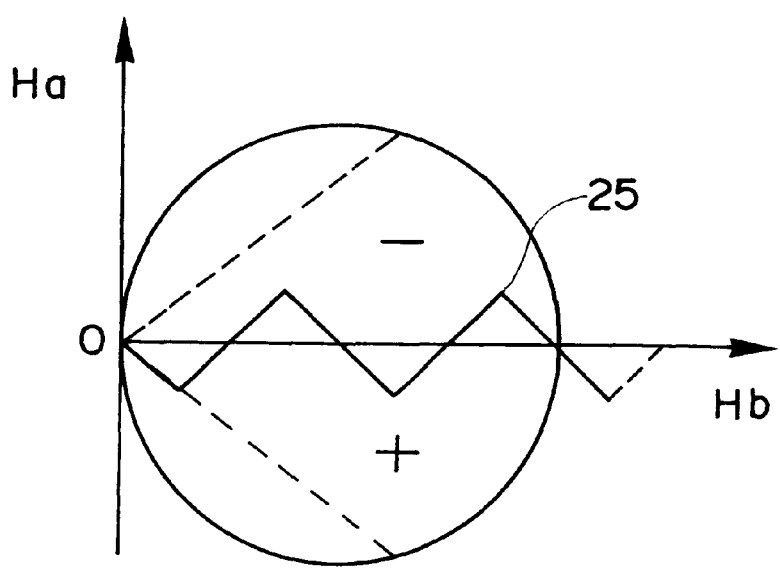

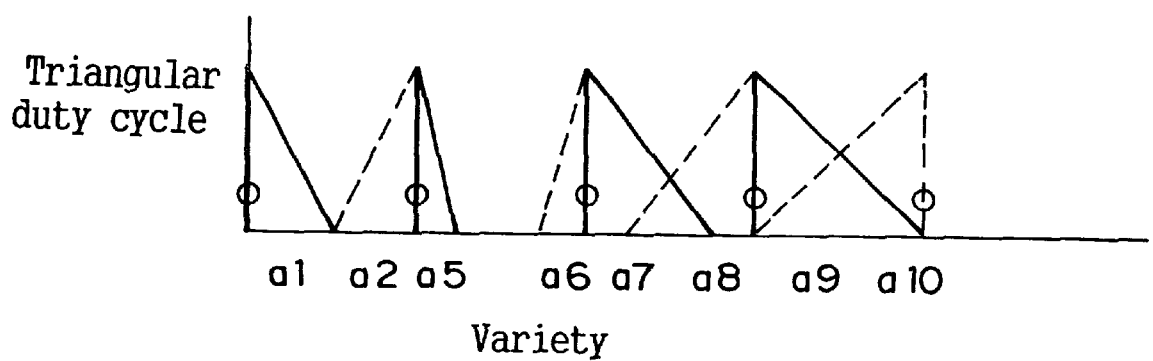
F I G. 2 3

F I G. 2 4
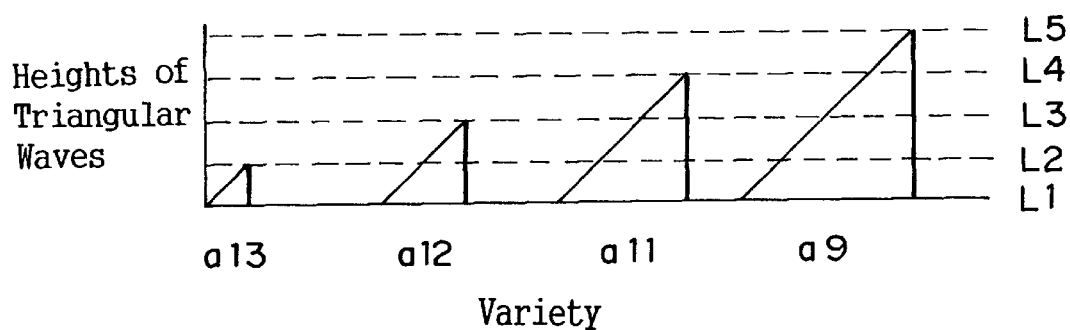
F I G. 2 5
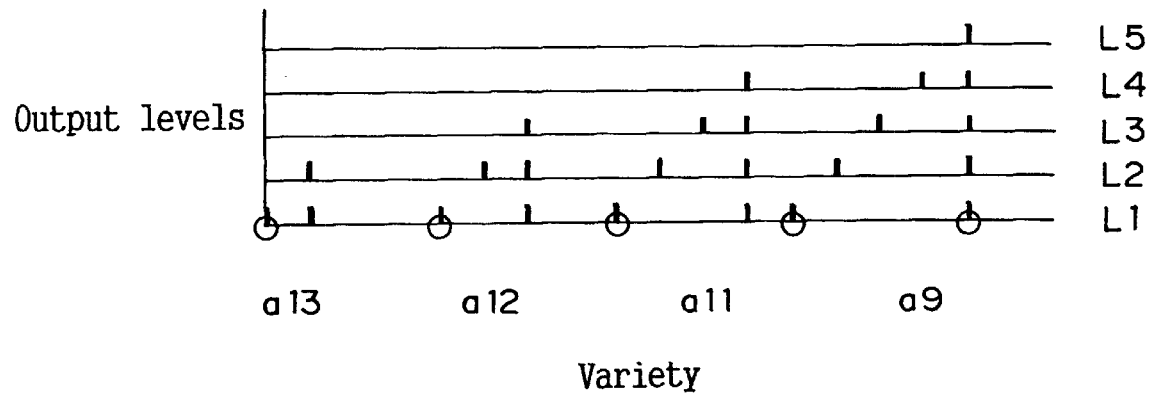

Magnetic points

Output waveform

F I G. 3 2
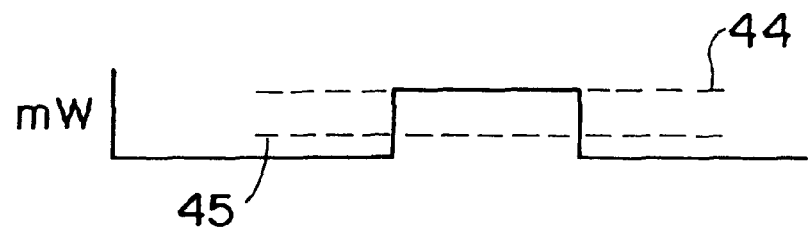
F I G. 3 3
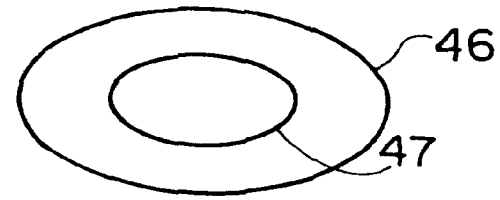
F I G. 3 4
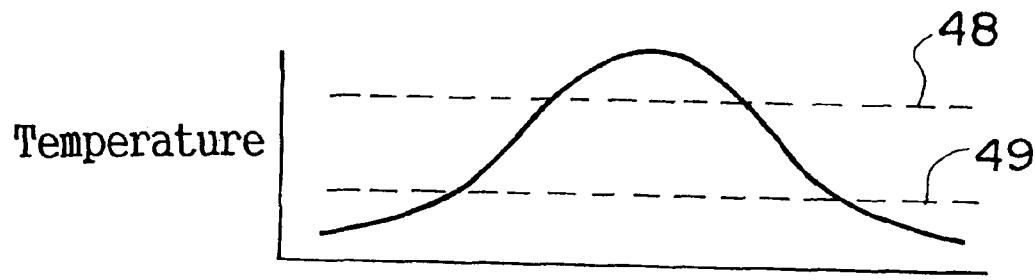

12345ABCDE

CODE-39 TEST

```
           n=3
         F    | F1  F2  F3           Fm
         n+1  | 4⁰  4¹  4²           (n+1)ᵐ⁻¹
       ┌ ×1  | 1    4   16           (n+1)ᵐ⁻¹ ×1
   n   │ ×2  | 2    8   32  ········ (n+1)ᵐ⁻¹ ×2
       └ ×3  | 3   12   48           (n+1)ᵐ⁻¹ ×3
```

F I G. 5 1

|  | F1 | F2 | F3 |  |
|---|---|---|---|---|
|  | $10^0$ | $10^1$ | $10^2$ |  |
|  | 1 | 10 | 100 |  |
|  | 2 | 20 | 200 |  |
|  | 3 | 30 | 300 |  |
|  | 4 | 40 | 400 |  |
| 5 × | 5 | 50 | 500 | 9 |
|  | 6 | 60 | 600 |  |
|  | 7 | 70 | 700 |  |
|  | 8 | 80 | 800 |  |
|  | 9 | 90 | 900 |  |
| T | 45 + | 450 + | 4500 | = 4995 |
|  | (9*5) | (90*5) | (900*5) |  |

F I G. 5 8
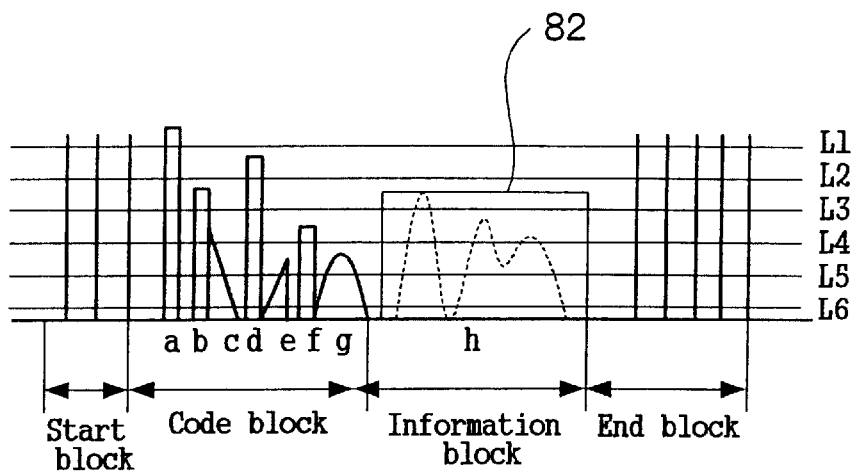
F I G. 5 9
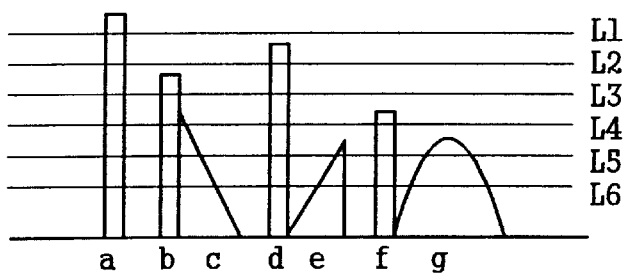
F I G. 6 0
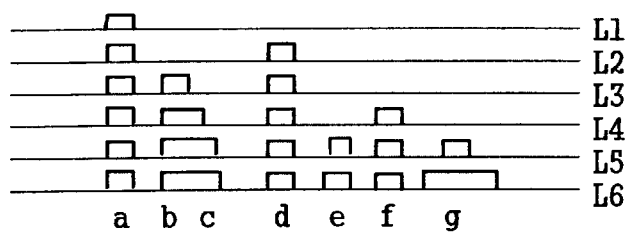
F I G. 6 1
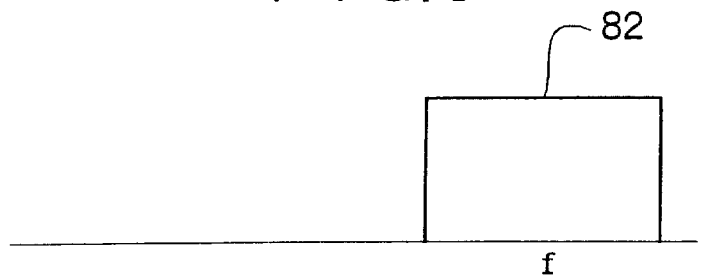

MULTI-VALUED DATA ELEMENTS FOR COMPUTER SYSTEMS

CROSS REFERENCE TO RELATED APPLICATIONS

This application is a continuation-in-part of U.S. application Ser. No. 09/402,006, filed Sep. 27, 1999, now U.S. Pat. No. 6,324,143, which was the National Stage of International Application No. PCT/JP98/01213, filed Mar. 20, 1999, and claims priority from Japanese Application No. 9-110005, filed Mar. 25, 1997; U.S. application Ser. No. 09/367,305, filed Oct. 22, 1999, which was the National Stage of International Application No. PCT/JP98/00468, filed Feb. 4, 1998, and claims priority from Japanese Application No. 9-63696, filed Mar. 12, 1997; and U.S. application Ser. No. 09/355,388, filed Jul. 27, 1999, which was the National Stage of International Application No. PCT/JP98/00126, filed Jan. 16, 1998, and claims priority from Japanese Application No. 9-46844, filed Jan. 27, 1997. Each of the foregoing US, international, and Japanese applications is respectively incorporated herein in entirety by reference.

BACKGROUND OF INVENTION

Today there is an absence of circuit technology for use with multi-valued data elements. A multi-valued data element may encode more information, in a variety of characteristics, than a binary valued date element in which the information contained therein is necessarily limited and is represented by "1's" and "0's". It is true that conventional binary technology and relating microcomputer technology can also be applied to multi-valued data, but the result is far from satisfactory.

As binary computer systems are based on the presence/absence of 1 (one), recording even a small quantity of data requires substantial recording space. For this reason, memory capacity is often found to be inadequate in compact recording media.

In contrast, the present invention provides a multi-valued recording system which enables a larger memory capacity and faster operating speed with a recording space of almost the same size as required by a conventional binary system.

This invention relates to a method of producing various kinds of memory points in a recording medium to record not only "1's" but also plural values in digital or analog form. The rules for the usage and decoding of multi-valued data elements on a particular recording, direct software, and etc., are written in the same medium.

There has been no comparable method of encoding multi-valued data elements for storage in a memory point up to now, so technology and hardware components to carry out this method, such as a memory unit for recording multi-valued data elements or a personal computer to process them, have not yet been developed.

Recording space for data is one important consideration for data storage methods and equipment. At present, recording media such as magnetic tapes and disks, optical disks, and etc. have been prepared to record signals with 0's and 1's in the binary system. Therefore, to deal with the large amounts of data the multi-valued data element system is expected to treat, the binary recording system needs a very large amount of memory medium since the recording operation is repeated over and over again at different memory points in order to store the data in binary format. But the size of a recording medium (tape, disk, etc.) has its own limit, and consequently so does its recording space.

For example, to put into practice code transmission systems, or any other multi-valued system in the future, there can be no other choice for the time being than using large quantities of binary memory storage media (magnetic tapes, floppy disks, or optical disks, etc.), using today's microcomputers or personal computers. However, although there is a growing need today to record large quantities of data, recording capacity of media is failing to grow proportionally. In fact, sometimes data recording becomes impossible due to a shortage of memory capacity.

For the time being, no alternative exists to recording data using the presence/absence of some quantity according to the binary system: using a hole or its absence in the case of punch tape; using a single type of recorded or erased magnetic point or optical dot in the case of conventional memories (i.e., a magnetic or floppy disk, optical disk, and etc.). However, the conventional recording system is insufficient to record a large amount of data from current sources of information. If the binary system is used, a very large quantity of memory is needed. The binary data recording system is, therefore, inherently limited and problematic.

Data recording cost is a second important consideration for data storage methods and equipment. The reduced data recording costs realized by the method of the current invention have a great influence on its marketability. While the binary system requires large quantities of magnetic tapes, disks, cards, etc., to record signals, the multi-valued data elements recording system needs relatively small quantities of recording media and their materials. So when the method according to the current invention is employed, recording costs will be reduced greatly.

In the determination of the writing/reading cost, recording density plays an important role. As the multi-valued data element recording method of this invention has high recording density by nature, the cost is inherently low.

Data recording and access speeds are a third important consideration for data storage methods and equipment. Computer systems are expected to operate at high speed. The method according to the current invention can increase the speed because of multi-valued data writing/reading.

Further, this method makes it possible to record signals in diverse tracks, i.e. multichannels, if a high recording speed is not necessarily desired.

In this way, this invention provides low cost, high density, high speed, and multichannels in data recording, as a result of using various magnetic or optical factors, making it possible to record, recognize, and read them out, and thus taking the place of the conventional recording method based on only the presence/absence of a hole, a magnetic point, or an optical dot, etc. It is also an aim of this invention to provide a simple method of memory correction.

Various kinds of multi-valued data signals can be used in recording medium according to the field of human activities in which this method is employed. The multi-valued data elements to be used are chosen at random at the recording in the particular field, and an ordinal number is given to each of them.

On the recorder's side, to, an ordinal number is given to each of the recording multi-valued data elements, which have been chosen independently from the data storing multi-valued data elements.

Through the correspondence of the two series of the ordinal numbers, the data storing signals are recorded with recording signals. The correspondence is arranged prior to the recording.

Rules for the recording method mentioned above, such as the ordinal numbers given to signals, the correspondence between them, as well as the relating software and commands, are written in a portion of the medium in advance. By doing this, the novelty and confidence will greatly be enhanced.

The invention further relates to methods for using multi-valued data elements. Electronic signals used in conventional technology generally rely on the presence or absence of a square pulse. Due to the nature of such signals, generally only the binary notation system is used for data encoding and transmission in modern computer systems.

Unfortunately, the binary notation system requires large number of bits for encoding data. This is especially problematic for wireless data transmission.

In this regard, available frequencies for signal carriers are severely limited. For example, in the 100 MHz range, current technology can barely provide assignments up to the third decimal place. The demand for available frequencies is extremely heavy and they cannot be sufficiently allocated. So frequencies must be registered in every country with the appropriate Radio Frequency Radio Regulation bureau to protect against signal interferences.

According to traditional design, only 0.1% of available frequencies are licensed for use. This is an exceedingly scarce supply and no way equal to the demand. Therefore, radio frequency regulations allow only weak output levels. This in turn, creates a kind of interference. In addition, noise interference from automobiles and other machines during reception and transmission becomes serious.

Moreover, a single signal typically requires several cycles of carrier wave in order to be transmitted due to the larger number of bits required for encoding in binary notation. Accordingly, the effective carrier-to-signal ratio is now reaching something between 100 to 1000 times. For example, a data signal on a carrier at 10 MHZ effectively becomes a 10 KHz signal. This intensifies a tendency to seek higher frequencies.

The present invention provides methods for using multi-valued data elements, not only for data recording, but only also for general computer usage and data transmission, such as with radio waves, sound waves, optical, magnetic and other types of data transmission.

SUMMARY OF INVENTION

Quantities to be used to record multi-valued data elements include strength, size, shape, etc. of magnetism in case of magnetic tapes and disks, and size, shape, etc. of an optical mark in case of optical disks. By using such quantities to encode data, it has become possible for one memory point to store multiple values. In this invention, the multi-valued data elements represent data not only as 0 or 1 (as in the binary system), but as any particular value produced at a memory point by a recorder. An extractor subsequently reads out digital or analog values recorded according to this process.

It is also possible to record and extract a plurality of data blocks, each composed of one or more memory points.

In other words, this invention intends to resolve the limitations of the binary system by storing data elements based on a plurality of quantities and encoding multi-valued meaning to each of the data elements prior to the recording, and making a memory point in which one of the multi-valued data elements is recorded at a memory point.

In order to make a single memory point suitable to record multi-valued data elements, where each value has a special meaning in a particular recording, it is necessary to digitize or analogize quantities of magnetism or light, like its intensity, shape, etc., so that each of the quantities can be recorded and extracted.

The low recording cost enabled by the multi-valued data recording method of the current invention yields high marketability for the method. This invention can be applied to conventional magnetic tapes, disks, and cards as well, all of which are currently widely used and which will be used even more widely in the future.

The recording density in this invention is very high by its nature, as a single memory point can represent multi-valued data. Processing speed is also enhanced according to the method of this invention because the reading/writing head does not need to move as frequently as with the binary system. Less frequent movements are required because this method uses multi-valued data elements.

It is also possible according to this invention to combine two or more memory points together, and to record or extract them at one time. That enables this method to record signals in diverse tracks.

The present invention accordingly provides a method to satisfactorily achieve the above-mentioned purposes.

BRIEF DESCRIPTION OF DRAWINGS

FIGS. 1–4 show the structure of a magnetic tape and a magnetic floppy disk suitable for storing multi-valued data elements;

FIGS. 6–8 show waveform characteristics of magnetic recording and reproduction;

FIGS. 9–11 show different states along an initial magnetization curve, including states of negative residual flux density produced by a direct current and an erased state produced by an alternating current;

FIGS. 22–27 are a series of illustrations of magnetic recordings, from waveforms of data signals to reproduced output, and discrimination of the latter;

FIGS. 28–34 show the structure of an optical disk, its operation method, marks, signals and their treatment, and the principle of the treatment;

FIG. 51 expresses decimal notation of everyday arithmetic with nine signals;

FIG. 58 illustrates a set of encoded start signals, code signals, information signals, and encoded signals produced by a sending device;

FIG. 59 shows the relation between received codes and sensing levels at a receiving device (the start and end signals are omitted here);

FIG. 60 shows the signals in FIG. 59 as sensed by each level;

FIG. 61 represents a block of information signals expressed as a single pulse;

DESCRIPTION OF THE PREFERRED EMBODIMENTS

Figure 3:
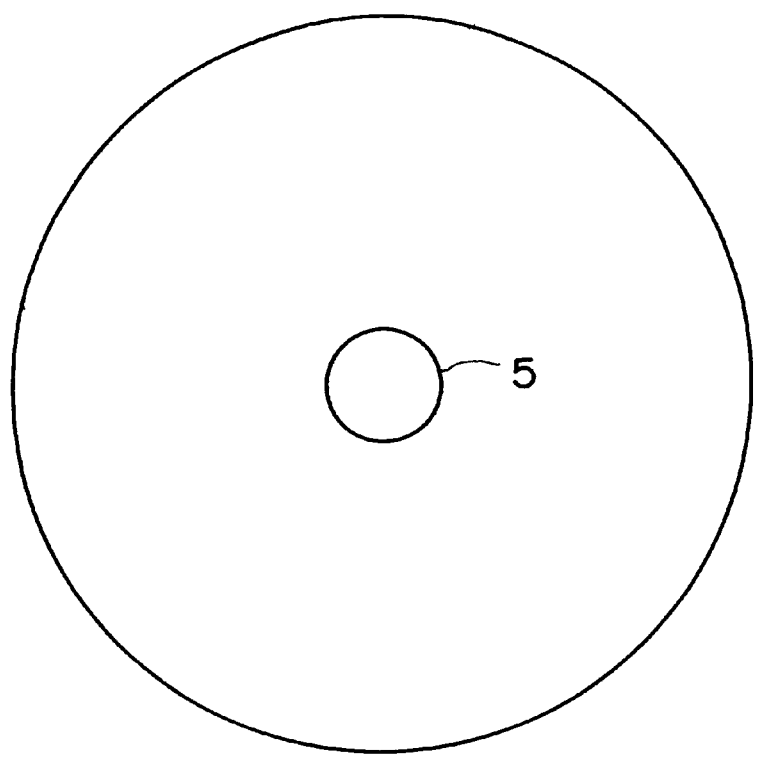

This is a description of preferred embodiments according to the present invention, with actual examples, referring to the drawings.

FIGS. 1–4 show examples of the structure of a magnetic film and a magnetic floppy disk suitable for multi-valued data elements. In these media, different kinds of magnetic points can be recorded according to the intensity of magnetism.

FIGS. 1 and 2 illustrate the structure of videotape as a plaster-type of flexible medium. FIG. 1 illustrates a plan view of the tape and FIG. 2 illustrates its vertical cross section.

As shown in FIG. 2, to a polyester base film 3, an undercoat 2 is applied. Then a magnetic layer 1 is formed by plastering a magnetic substance such as $Y-Fe_2O_3$, $CrO_2$ or $Co-Y-Fe_2O_3$ with a binder onto the undercoat. On the reverse side, a back coat 4 made of conductive carbon is applied for protection.

FIG. 3 shows the structure of a magnetic floppy disk for computers as a thin-film type of hard medium. FIG. 3 is a plan view of the disk and FIG. 4 shows its vertical cross section.

Figure 4:
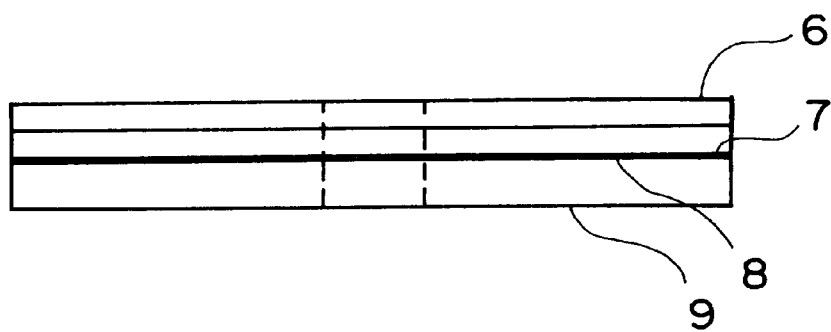

As shown in FIG. 4, to a base disk 9 of AlMg alloy, a Ni—P undercoat 8 is applied by electroless plating. On the undercoat, plating or sputtering forms a magnetic layer 7 of Co—Ni—P or Co—Ni. On the surface of the layer, a film 6 of C or $SiO_2$ is applied for the purpose of protection and smoothing.

Figure 5:
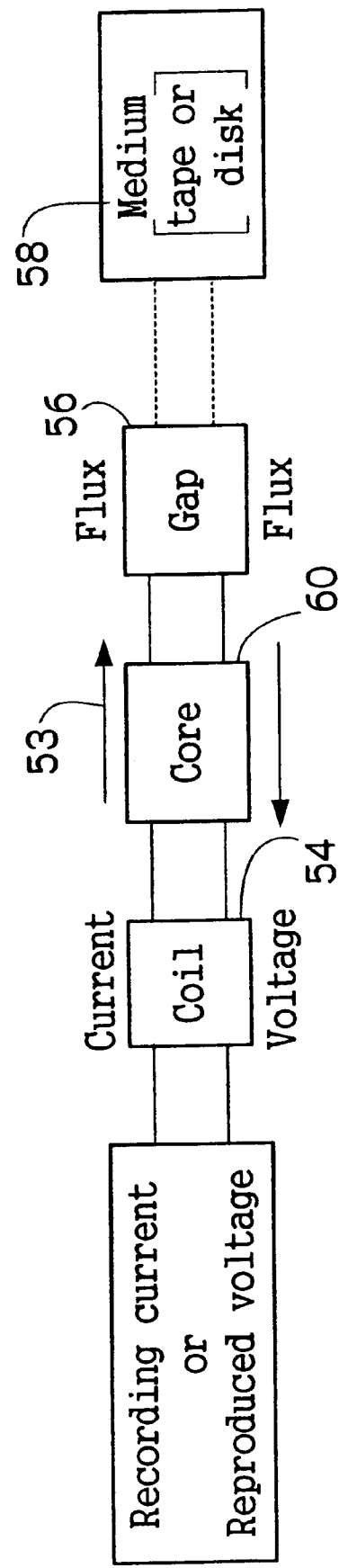
FIG. 5 shows the structure of a magnetic head for recording multi-valued data elements in a preferred embodiment according to the present invention.

In order to record signals in a medium and reproduce them a magnetic head is needed. FIG. 5 is a diagram of the structure of a magnetic head. For recording, a recording current 53 is run through a coil 54. A magnetic flux is thereby generated, which extends through a gap 56, permeates space and records a magnetic point on the medium 58.

In order to read, leakage flux of a magnetic point on the medium 58 is measured through the space of the gap 56, the signal then runs through the core 60. An electric current is generated at the coil, producing a reproduction voltage.

Figure 7:
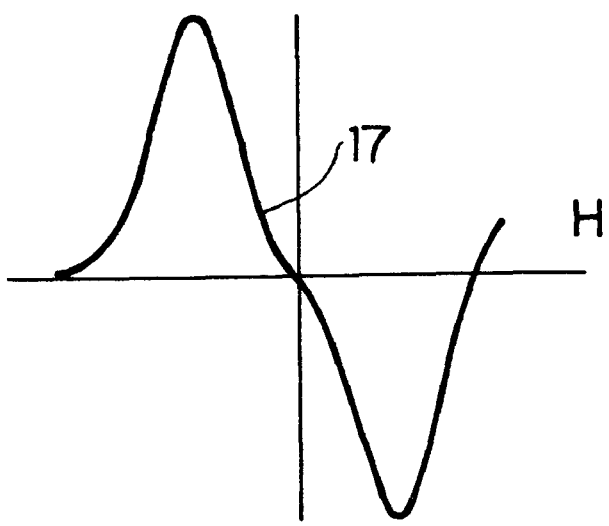
Figure 8:
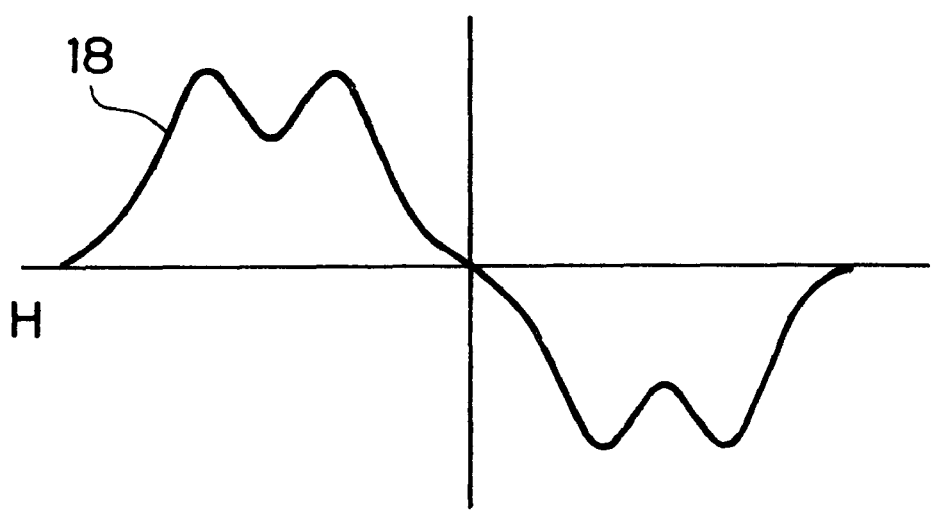

FIGS. 6–8 illustrate the characteristics of magnetic recording and reading.

FIG. 6 shows that magnetic recording basically has the same non-linear characteristic as the amplification characteristic of a semiconductor.

Reference number 61 in FIG. 6, indicates a hysteresis characteristic (a magnetization curve or a J-H curve). Reference number 62 indicates a magnetic field waveform of an input signal: Solid line 15 represents an input signal magnetic field waveform generated by a direct current, and dotted line 16 represents an input signal magnetic field waveform generated by an alternating current. In this example, the heights of the waveform generated by a direct current correspond to, and are reflected by, a recording magnetization characteristic 11, which is the initial hysteresis magnetization curve 10. Reference numeral 63 indicates leakage flux waveforms: solid line 13 represents a leakage flux waveform resulting from a direct current, and dotted line 14 represents a leakage flux waveform resulting from an alternating current.

The heights of the magnetic field waveform 62 of the input signal corresponds to the heights of the leakage flux waveform 63. Thus when a recording current with various heights according to input signals goes through the coil, various intensities of magnetization are generated in the medium. Similarly, the intensity of a leakage flux in the medium yields various heights in the reproduction voltage. This principle provides a characteristic feature for the present invention.

FIGS. 7 and 8 show the relationship between the magnetization of the medium and the reproduction output. A waveform of leakage flux 17 in FIG. 7 magnetized in the medium produces reproduction voltage in comparison with time differential value, and results in a waveform 18 in FIG. 8. A shaping circuit can be used to trim this distorted waveform.

Figure 9:
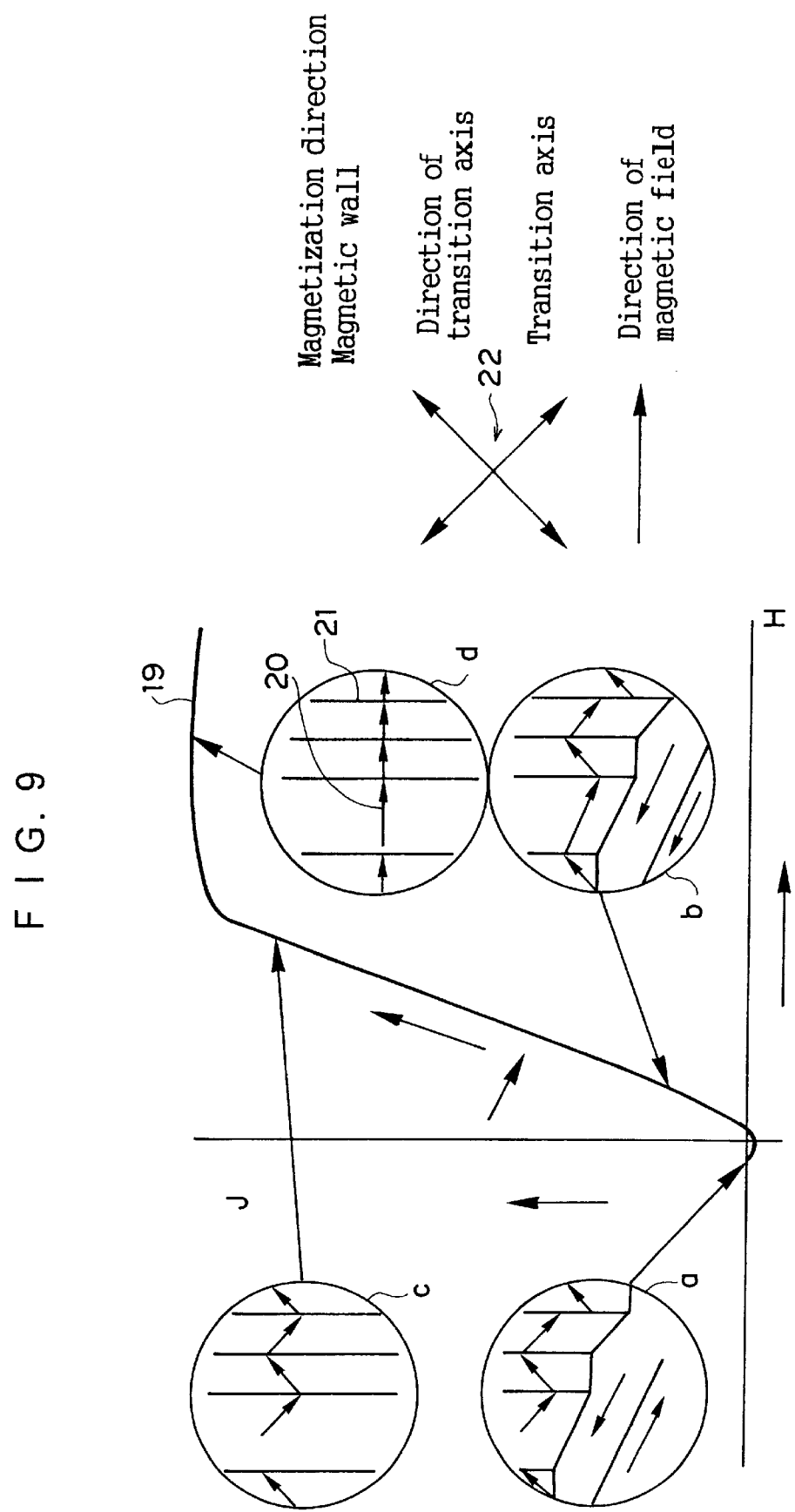

FIG. 9 illustrates various magnetic domain states a-d in the four circled areas at selected points along the initial magnetization curve 19. The states are expressed in terms of the magnetic walls and magnetization directions (spins) along with the movement of the transition axis 22 of magnetization.

In FIG. 9, magnetic domain state a corresponds to an erased state a, with its transition axis in the center. This is the case when an external magnetic field H is not put on the ferromagnetic bulk material. When a weak external magnetic field is put on this erased state a, the transition axis moves, and the domain turns into the state b. A stronger external field turns the domain into state c, which looks fully magnetized as a whole. And a much stronger external field brings the domain to the state d.

As shown in FIG. 10, application of the much stronger external field results in a state for the domain such that all the magnetization inversion lines 24 are expanded from the inverse saturated magnetic field toward the P-particle distribution range 23. FIG. 11 illustrates the erased state produced by an alternating current. On both sides of a zigzag magnetization inversion line 25, the numbers of positive and negative magnetization particles are approximately equal, resulting in the erased state. The higher the frequency of the erasing current, the finer the zigzag becomes.

Figure 12:
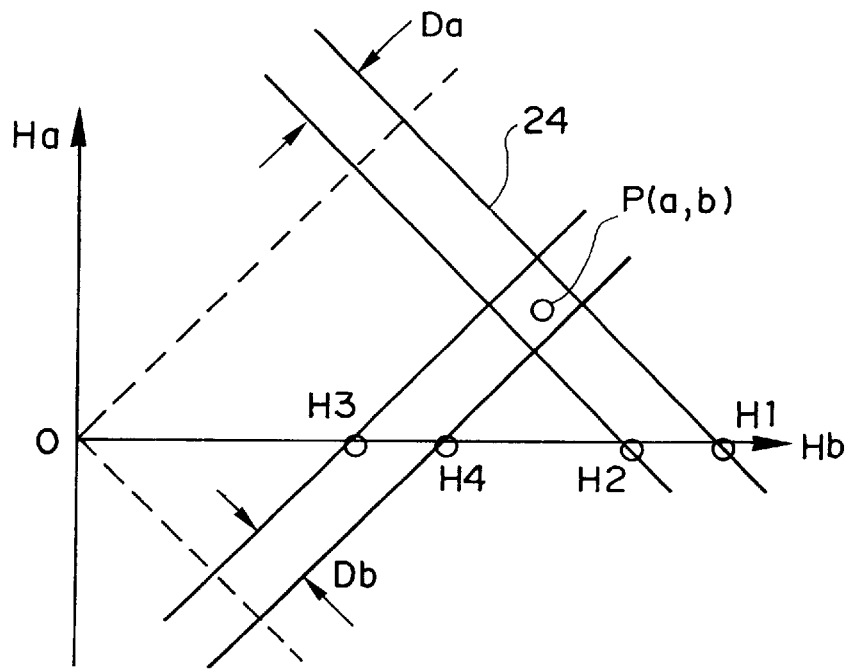
FIGS. 12 and 13 show density distribution of P-particles, and the relationship between density and hysteresis characteristics.
Figure 13:
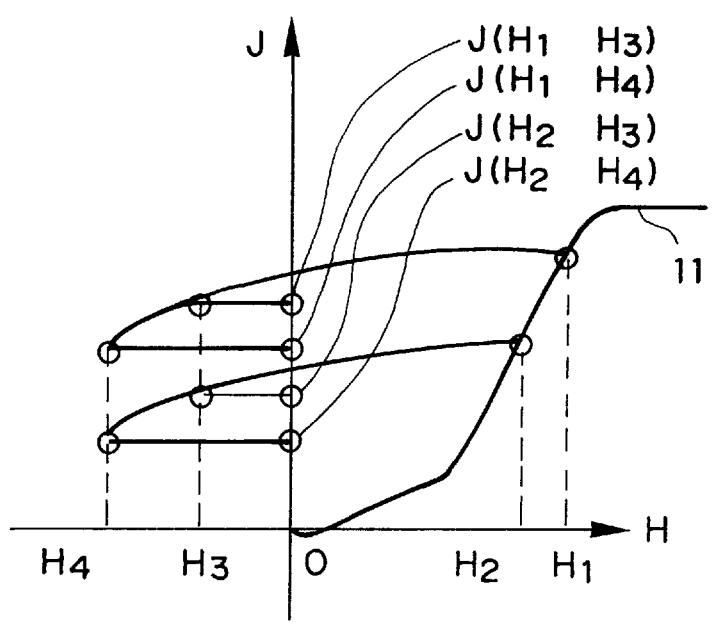

FIG. 12 illustrates the density distribution of P-particles, ρ (a,b) DaDb, in microsquares Da and Db around a point P(a,b). FIG. 13 shows the relationship between ρ(a,b) DaDb, i.e., the density distribution in FIG. 12, and the hysteresis characteristic. The relationship can be expressed by the following formula:

$$\rho(a,b)DaDb=J(H_1H_3)-J(H_1H_4)-J(H_2H_3)+J(H_2H_4)$$

Figure 14:
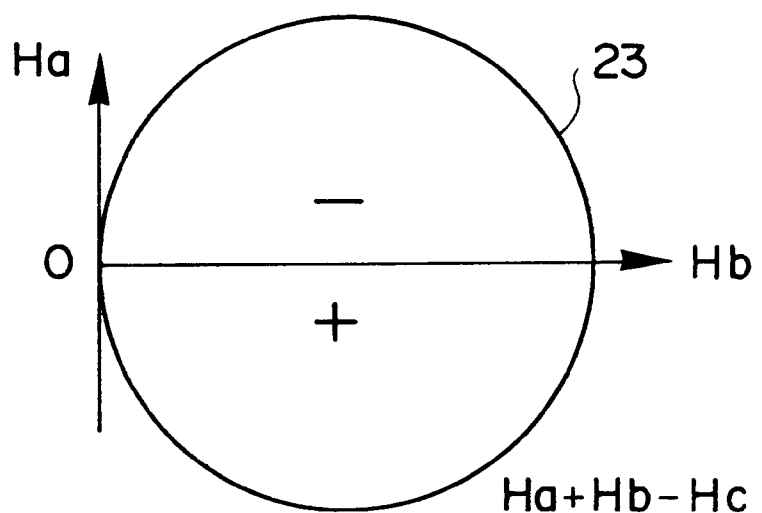
FIGS. 14–20 shows the relationship between hysteresis characteristic and each state.
Figure 20:
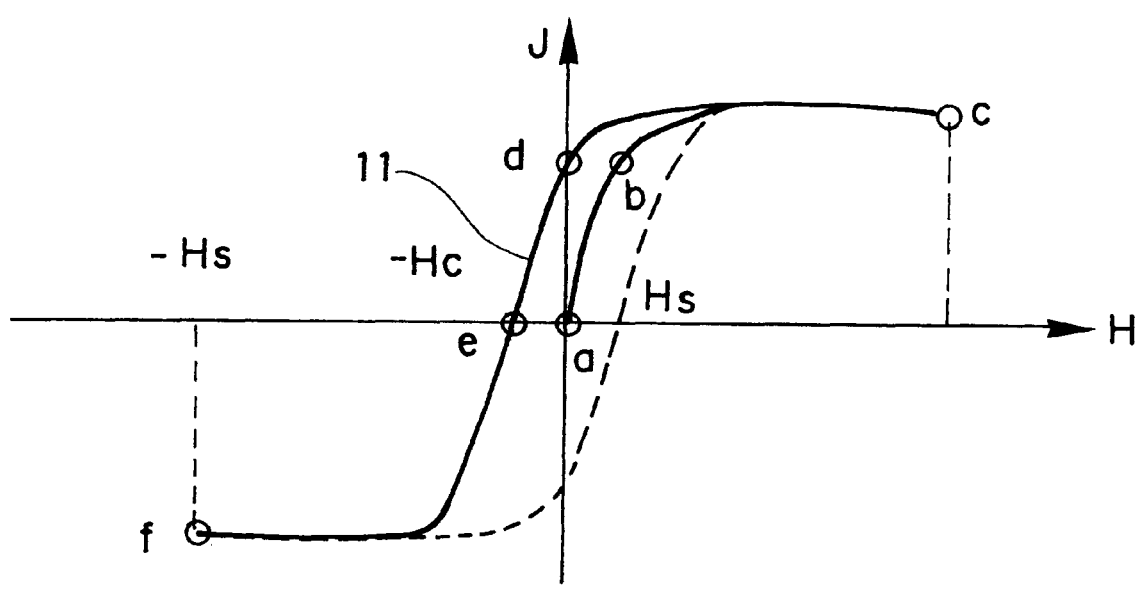

FIGS. 14–20 explain the relationship between the hysteresis characteristic and the magnetic domain states as follows:

FIG. 14 shows the erased state, which corresponds to the point a in FIG. 20, as the initial condition of the hysteresis characteristic.

Figure 15:
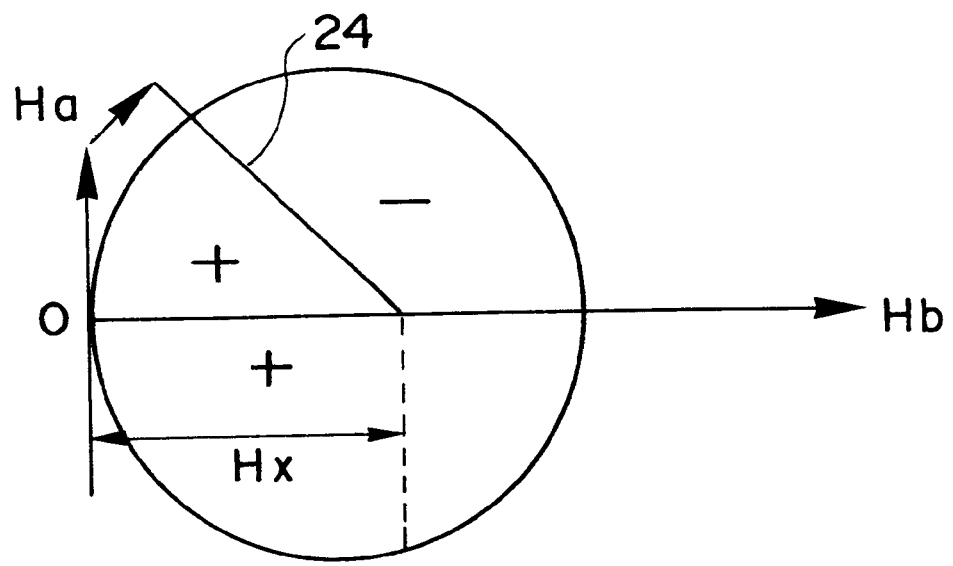

FIG. 15 is the state corresponding to the point b in FIG. 20, where an external magnetic field Hx is put on the medium in the positive direction.

Figure 16:
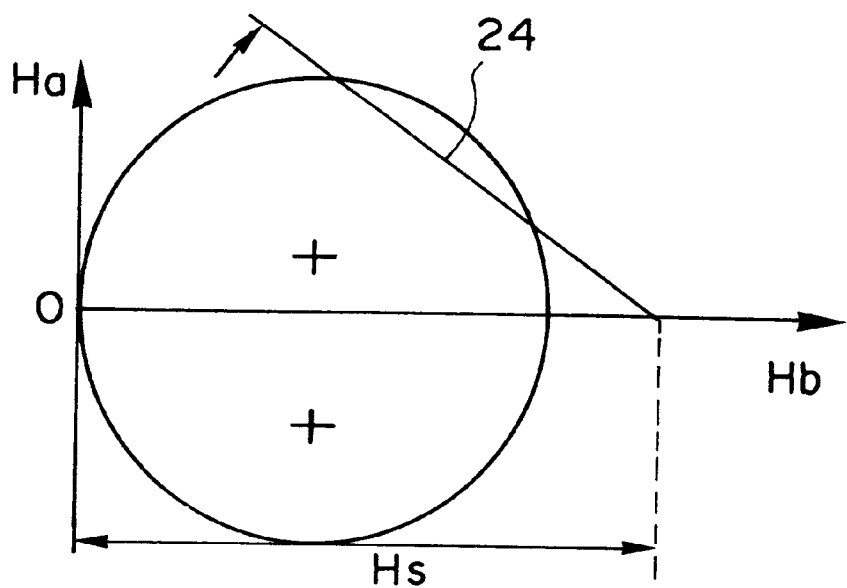

FIG. 16 corresponds to the point c in FIG. 20, where a much stronger external magnetism Hs has shifted the magnetization inversion line to the right, bringing the domain to the state of positive saturation.

Figure 17:
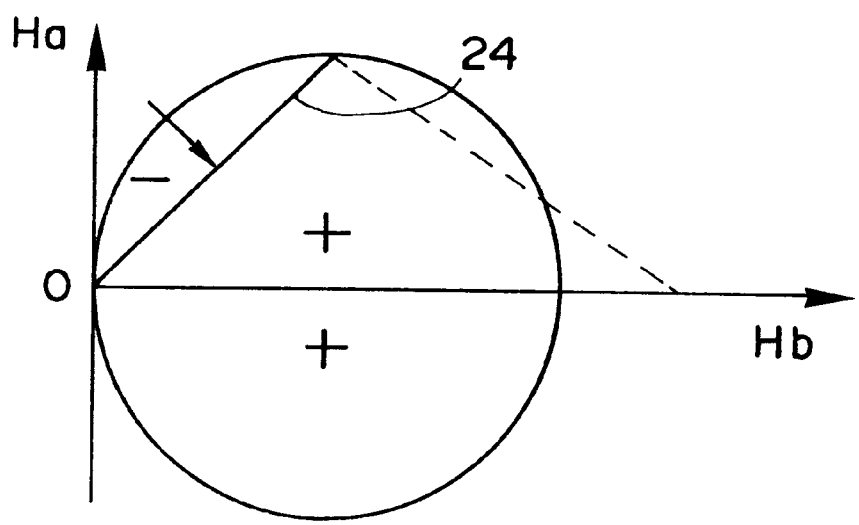

FIG. 17 is the state of positive residual magnetization, which corresponds to the point d in FIG. 20. As the external magnetism decreases its intensity to zero, the point c in FIG. 20 shifts to d.

Figure 18:
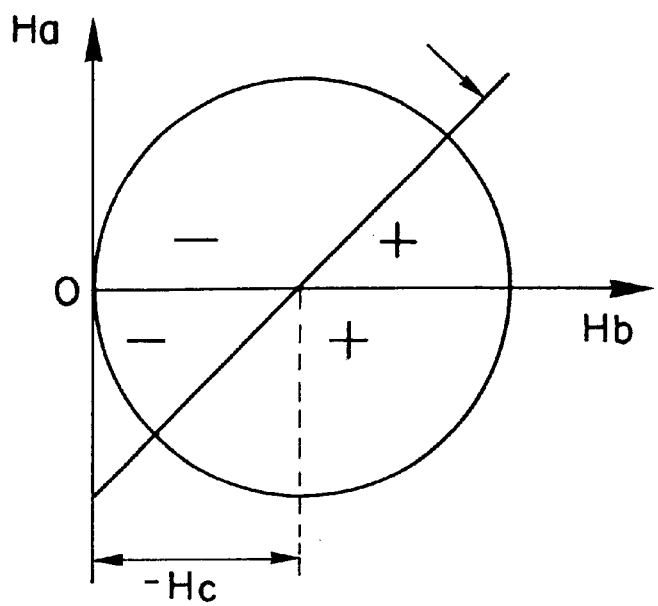

FIG. 18 corresponds to the point e in FIG. 20. An external magnetic field Hc has worked in the negative direction until the point d in FIG. 20 shifts to e, where coercive force is generated.

Figure 19:
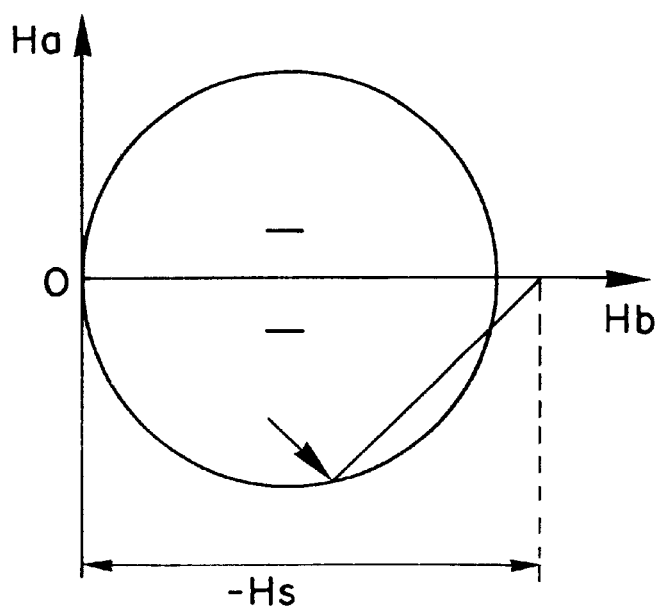

In FIG. 19, the state corresponds to the point f in FIG. 20 and is that of negative saturation brought about by a much stronger negative magnetism Hs.

Figure 21:
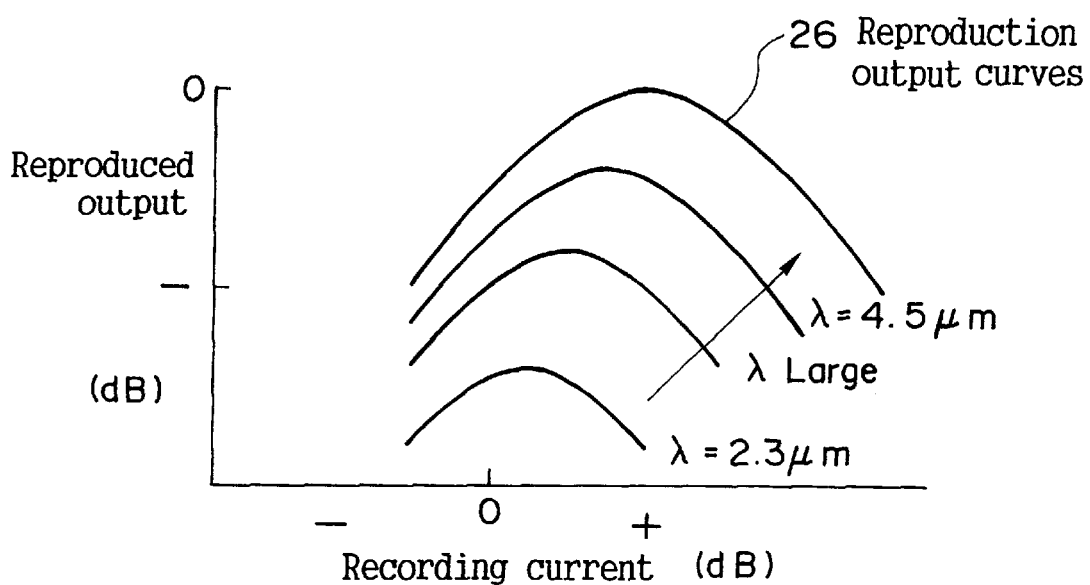
FIG. 21 shows the relationship between recording current and reproduced output with wavelength as a parameter.

FIG. 21 shows that when recording current i and its wavelength λ vary according to input signals, reproduced output also changes. This fact is important.

From the foregoing, it is obviously possible to vary the intensity of recording magnetic fields. And from FIG. 21, it is also clear that the recording magnetic field varies its intensity in accordance with recording current and its wavelength. The reproduced output generated by the leakage flux of the magnetic field also varies in a corresponding manner.

The magnetization of one particle in a single domain in a medium is achieved only by the rotation of the magnetization direction. In such a case, substantial energy is needed to change the direction against crystal magnetic anisotropy. This fact provides a strong coercive force for the domain.

Figure 22:
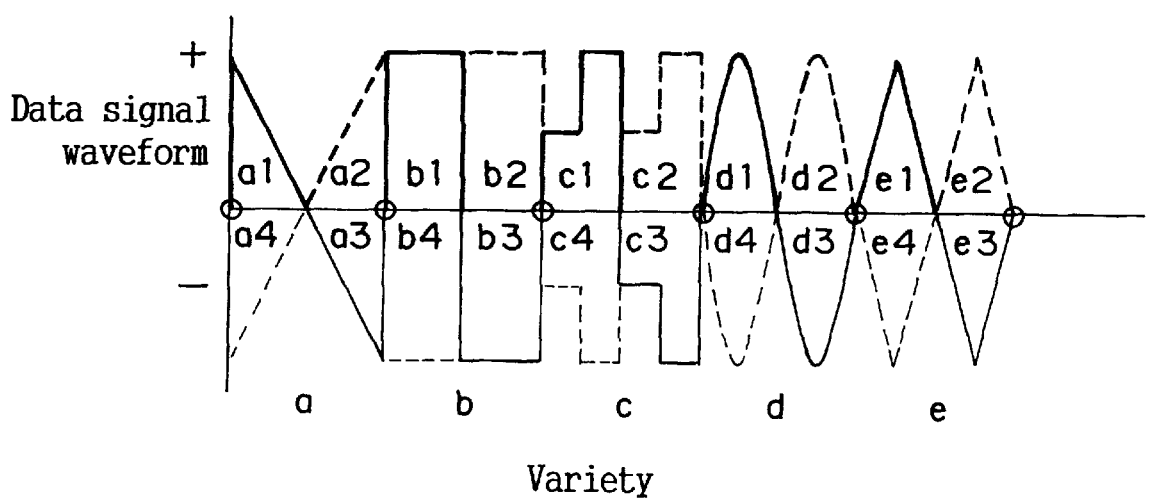

FIGS. 22 and 23 show a variety of data signals waveforms for recording by a recording current, and their reproduced counterparts discriminated from one another.

FIG. 22 illustrates examples of data signals to be recorded. These signals are input into the magnetic head, with a signal of the highest level at their beginning, in order to adjust for level sensing.

FIG. 23 shows the reproduced counterparts of the data signals in FIG. 22. After an AGC or limiter is adjusted to the highest level, sensing levels discriminate the waveforms of the signals correctly.

FIG. 24 shows triangular wave data signals with four different heights (L2–L5).

FIG. 25 shows the level output by sensing the height of the triangular data signals in FIG. 24 by the levels L1–L5.

Figure 26:
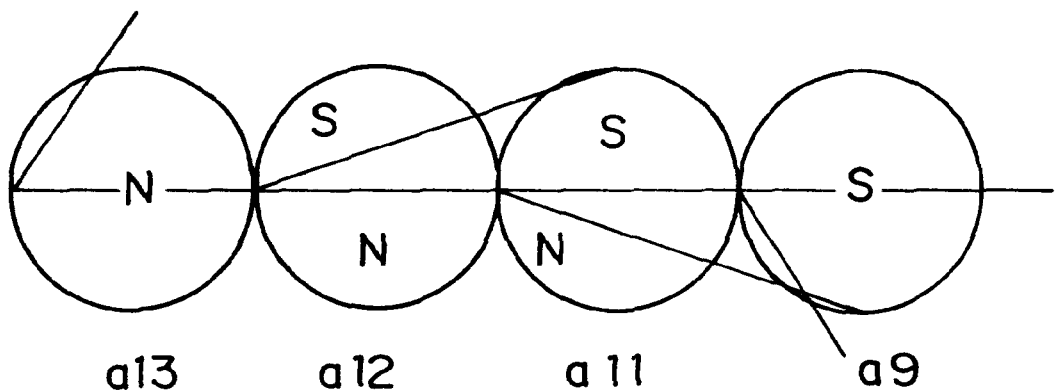

FIG. 26 explains an example of magnetic recording with multi-valued memory points.

Figure 27:
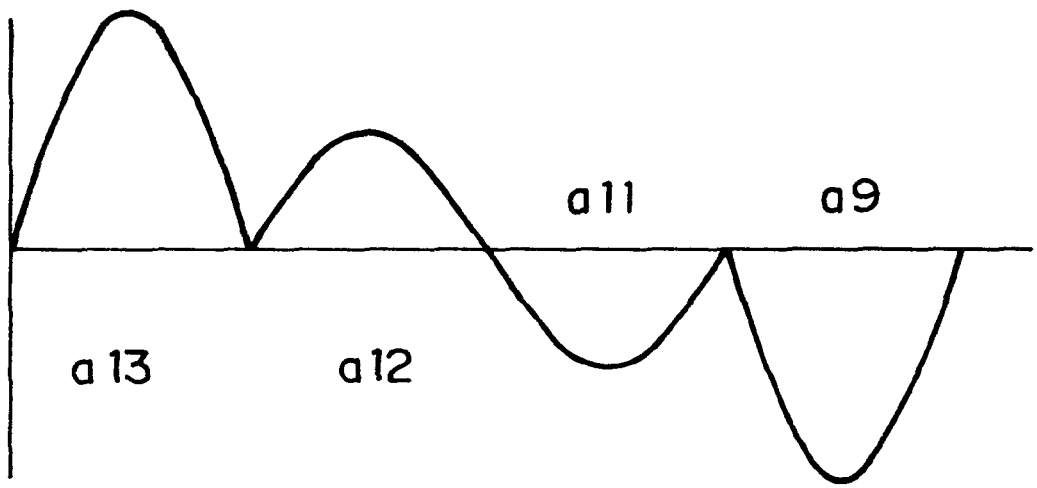

FIG. 27 is an output waveform of the recording in FIG. 26.

FIGS. 28–32 illustrate the recording system with an optical disk for multi-valued data elements in which shape, length, and etc., of optical marks are used as signals, and in which the marks can be written, read-out, erased, and corrected.

Figure 28:
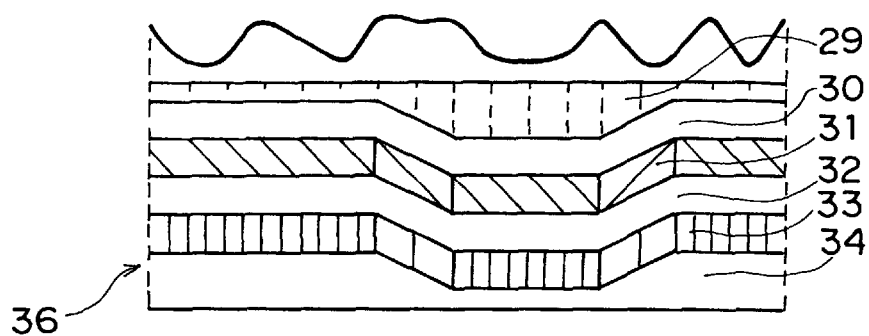

FIG. 28 illustrates a section taken vertically through a two-sided optical disk 36 used for an experiment of this invention. As illustrated, the disk includes a base plate 34 of polycarbonate, a dielectric layer 33 of ZnS—SiO$_2$, a recording layer 32 of GeTe—Sb2Te3—Sb, another dielectric layer 31 of ZnS—SiO$_2$, a reflecting layer 30 of Al, and an adhesive layer 29 to bind the two sides.

Figure 29:
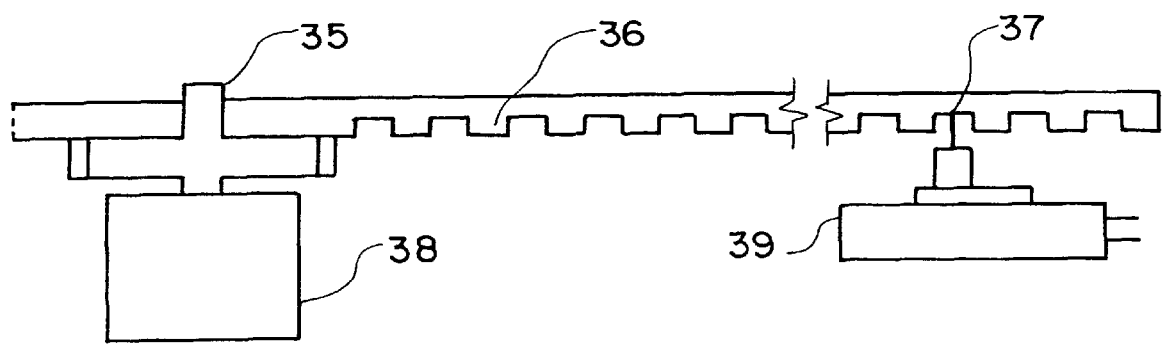

FIG. 29 shows means to drive the optical disk 36 for multi-valued data recording. To drive the disk 36, it is placed onto the shaft of a motor 38, which at the same time serves as the disk drive shaft 35. To write-in and read-out signals, laser light 37 is emitted by an optical head 39. During read-out, the head 39 detects the change of reflection rate of the emitted laser light reflected by the medium.

Figure 30:
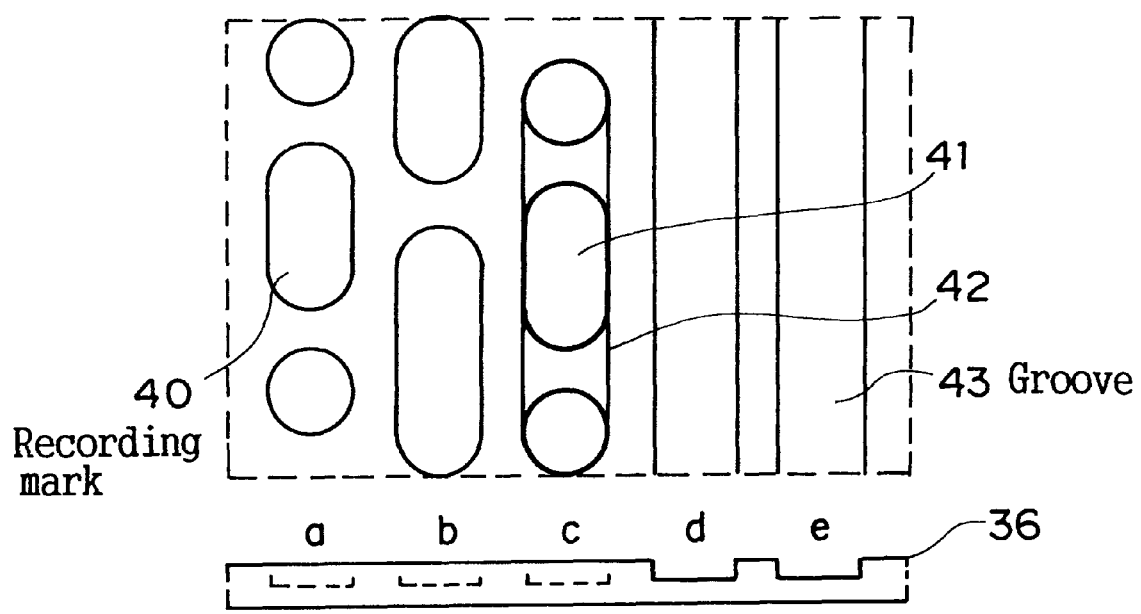

FIG. 30 illustrates recording conditions in the optical disk for multi-valued data elements 36.

In FIG. 30, some examples of recording marks are shown in rows a and b of the disk 36. Row c shows that an old mark 42 has been erased and a new mark 41 written in the row.

The optical disk 36 was 2.5 mm thick, and 120 mm in diameter. The wavelength of the laser was about 800 nm, rotary velocity of the motor 1800 rpm, and driving velocity 30 rpm. Recording power was about 20 mW, linear velocity 10 m/s, and length of a mark 1 μm. The grooves d and e were 100 nm deep, 1.6 μm wide, and 0.8 μm apart from each other.

Figure 31:
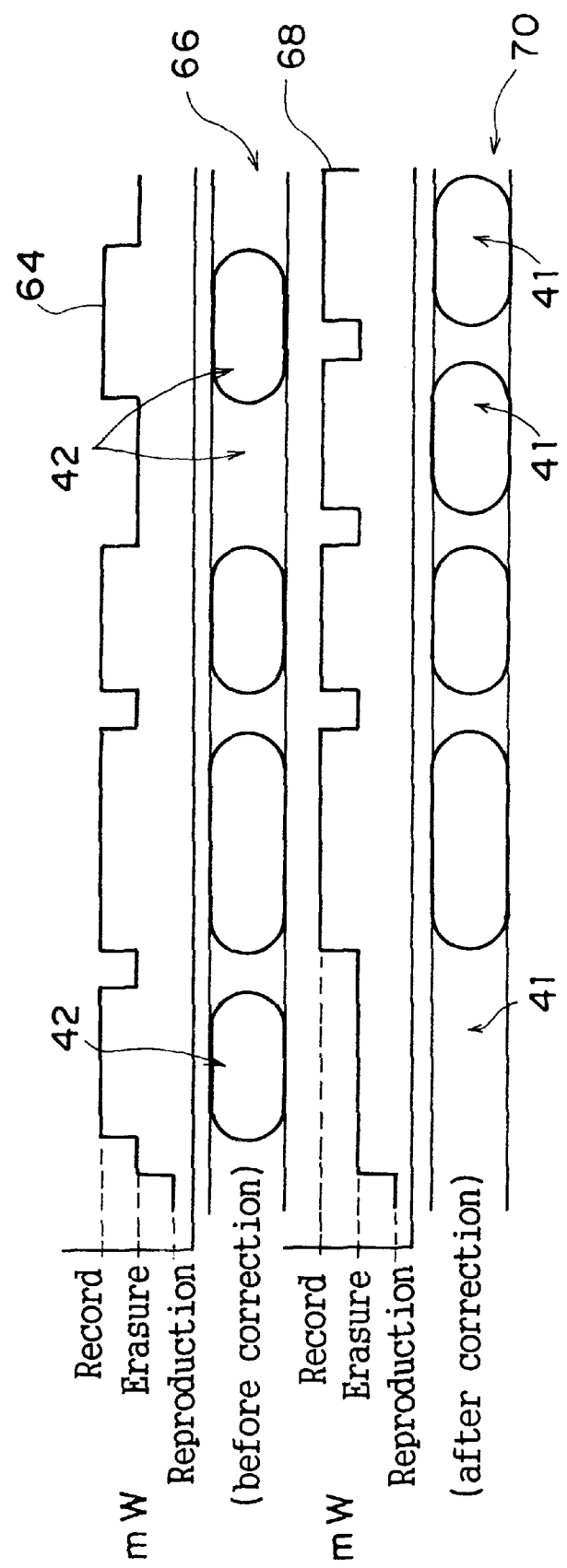

FIG. 31 shows the relationship between laser power and patterns produced by the head 39. When laser power 64 for reproduction, erasure, and recording is applied to the disk as in FIG. 31, patterns are produced and recorded as in the marking 66 of the figure. In order to correct these patterns, laser power 68 for correction is applied as in FIG. 31. Then the patterns are corrected as in marking 70 of FIG. 31

FIG. 32 expresses conditions for use of GeTe—Sb$_2$Te$_3$—Sb in the recording layer of the disc when amorphized or crystallized by the power of a laser pulse: the recording layer is amorphized by a laser pulse of 80 ns in duration and 20 mW of power, and it is crystallized by a laser pulse with the same duration and 10 mW of power.

FIG. 32 shows power levels for the laser power: reference numeral 44 indicates the level for recording power, while reference numeral 45 indicates the level for erasing power. FIG. 33 shows a plan view of pattern states (an erased ring 46 and a recorded ring 47). As can be seen from FIG. 34, impressed temperatures between the crystallization level 49 and the melting level 48 of the material, make larger patterns, while temperatures greater than the melting level 48 result in smaller patterns.

Figure 35:
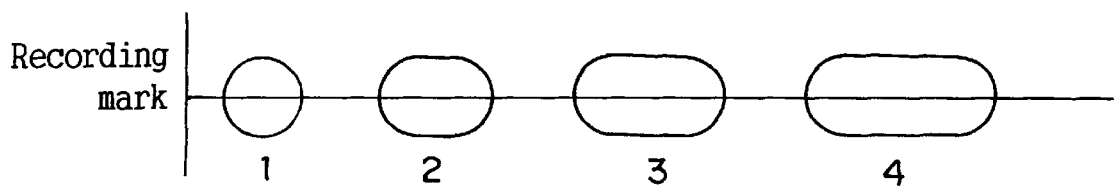
FIGS. 35–37 show recording marks in an optical disk, sensed output, and a double mark system.
Figure 36:
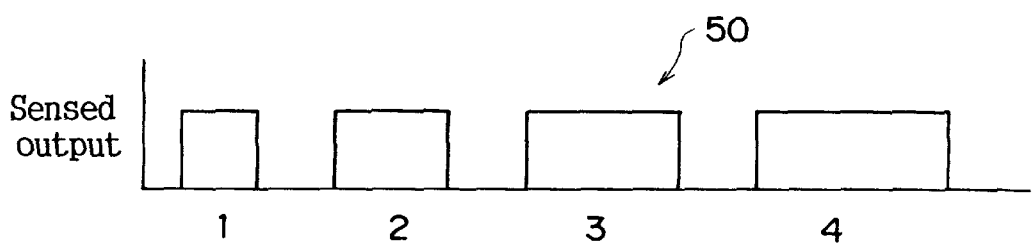
Figure 37:
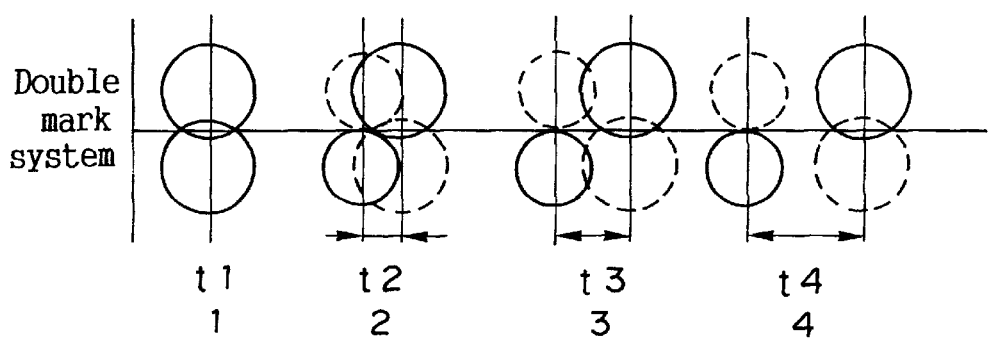

FIG. 35 shows examples of marks in an optical disk for recording multi-valued data elements. FIG. 36 shows the marks of FIG. 35 reproduced as pulses 50. A circuit integrates the length of each mark to determine a corresponding pulse level, and a level sensor senses and discriminates between the pulses 50. FIG. 37 illustrates a double mark system, wherein according to the width of a lateral or vertical gap t, a numerical value is assigned.

Figure 38:
FIGS. 38 and 39 show standard bar codes.
Figure 39:

FIGS. 38 and 39 show examples of standard bar codes: FIG. 38 illustrates high-density bar code, while FIG. 39 illustrates low density bar code. With four kinds of thickness of bars and various breadths between them, the bar codes express a number of parameters. These bar codes are shown here for comparison with a preferred embodiment of a recording method in accordance with the present invention.

Figure 40:
FIGS. 40–42 together show a preferred embodiment of a method in accordance with the current invention applied to the discrimination of bar codes by bar thickness, breadth between bars, and bar length.
Figure 41:
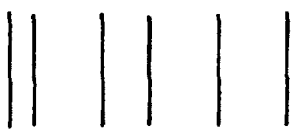
Figure 42:
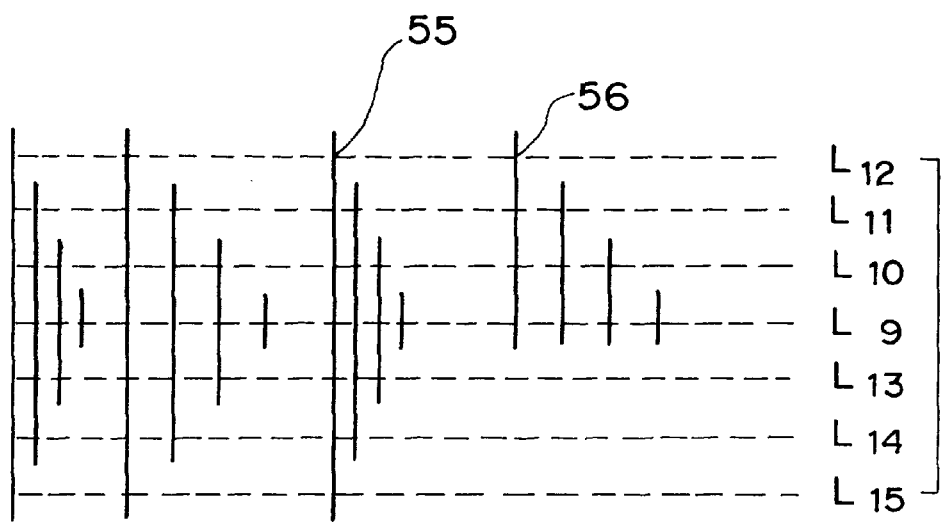

FIGS. 40–42 together illustrate examples of preferred embodiments of recording method in accordance with the present invention.

FIG. 40 is an example of bars 53 of different thicknesses, and FIG. 41 is an example of different breadth between bars. These parameters are the same as conventional bar codes. The quantity of data that can be expressed by these elements is now becoming limited.

So in FIG. 42, a preferred embodiment in accordance with the present invention uses length of bars as codes, sensed by a level sensor to encode additional data values. Reference numeral 56 indicates positive codes and reference numeral 55 indicates positive-negative (length of each bar measured upward and downward, relative to an reference level common to all of the bars). Combining these parameters with standard bar code techniques greatly increases the quantity of information that can be encoded with bar codes.

Figure 43:
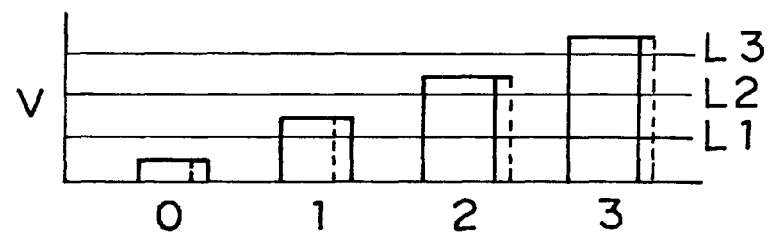
FIGS. 43–46 show signals which can comprise a unit for a multi-valued data element.

FIGS. 43–46 show four signals which can comprise a unit for a multi-valued data element. Specifically, FIG. 43 shows voltage levels and the relation between the width of the signals (drawn in dotted lines) and their levels. The signals 0 and 1 have the same width, but different levels. The width of the signals 2 and 3 are the same (though different from that of 0 and 1), but their levels are not the same. The signals 0 and 1 are used for conventional binary notation, and the signals 1, 2, and 3 can be used for ternary notation for encoding data.

Figure 44:
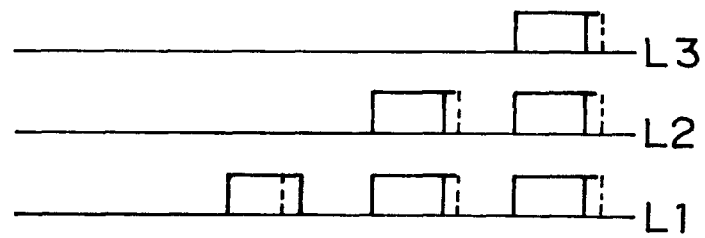

FIG. 44 illustrates the output for each signal in FIG. 43. The signal 0 produces no output at L1, L2, and L3; the signal 1 produces an output at L1, and not at L2 or L3; the signal 2 produces output at L1 and L2, and not at L3; and the signal 3 produces output at L1, L2, and L3.

Figure 45:
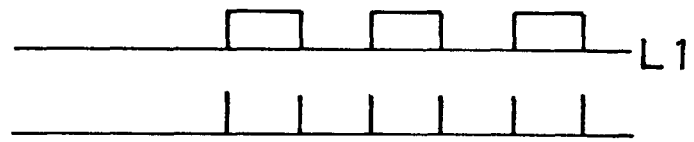

FIG. 45 expresses the relation between up and down transitions for conventional pulses at L1.

Figure 46:
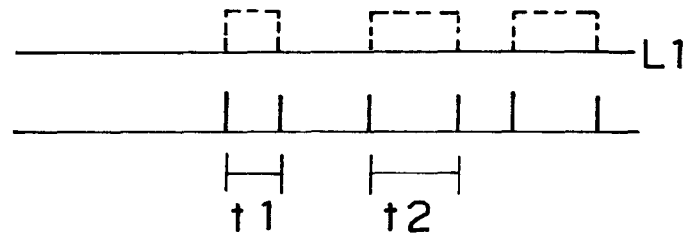

FIG. 46 shows the relation between the rise and fall of the three pulses, drawn in dotted lines, at L1. The width can be measured by comparing the length of time from rise to fall.

Figure 47:
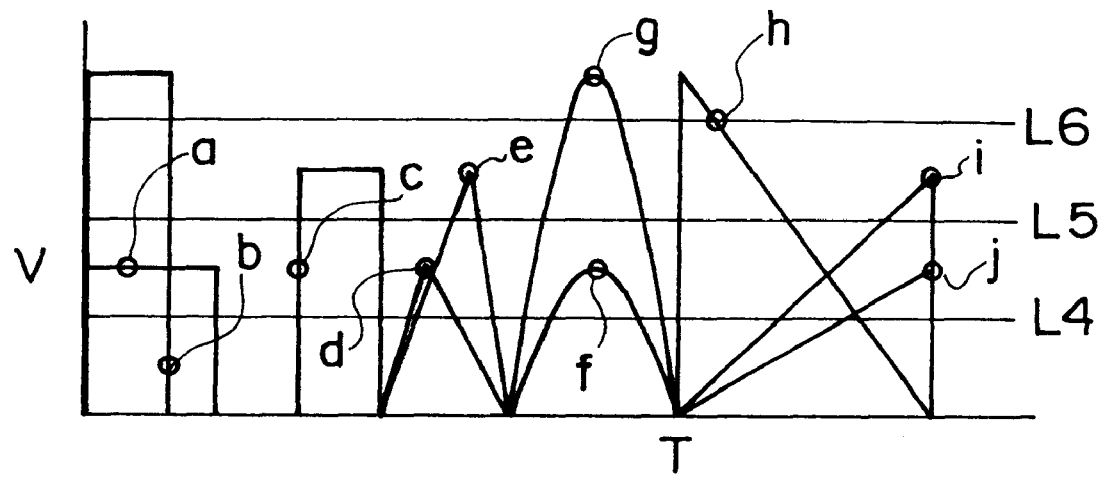
FIGS. 47 and 48 are additional examples of signals that can be used for encoding multi-valued data elements.
Figure 48:
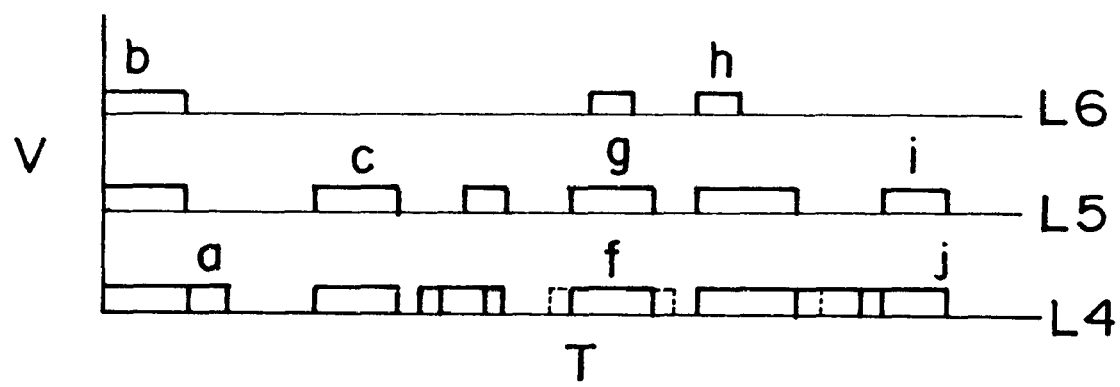

A single multi-valued data signal can comprise not only the four kinds shown in FIG. 43, but may be of ten or more different kinds. In particular, FIGS. 47 and 48 illustrate ten additional examples of signals. The examples are arbitrarily selected from the various signals which can be generated according to any combination and/or repetition of level, width, duty, frequency, waveform of voltage, current, and which can be sensed with a few levels.

Signal a in FIG. 47 is a square wave, with its duty being ½, and having a low level. Signal b is a square wave having a duty of ⅓, and a high level. Signal c is a square wave having an inverse duty of ⅓, and high level. Signal d is a triangular wave having a low level. Signal g is a sine wave having a high level. Signal h is a saw tooth wave having a reversed high level. Signal i is a saw tooth wave having a high level. Finally, signal j is a saw tooth wave having a middle level.

In this situation, only the down state is considered. FIG. 47 illustrates the level (height) and width (duration) of each signal. In comparison, FIG. 46 illustrates only the width of each signal. In this case, only the width is used. Namely, the value of 1 corresponds to the signal having the smallest width. Similarly, the value of 4 corresponds to the signal having the greatest width.

Sensing levels L4, L5, and L6 as shown in FIG. 48, are used to discriminate between the signals of FIG. 47. Here, the recording of square pulses with three different levels makes it possible to recognize complicated waveforms. As this case shows, the number of different signals can be greater than the number of sensing levels.

Figures 49, 50:
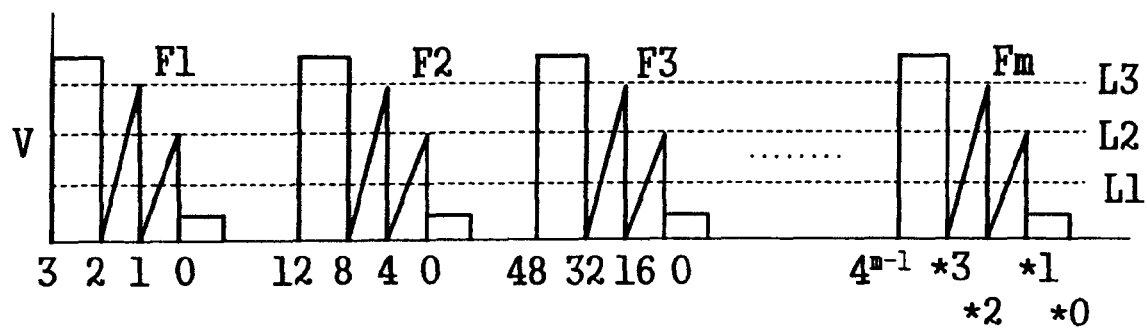
FIG. 49 shows examples of blocks of data formed from signals representing multi-valued data elements.
FIG. 50 illustrates a preferred method for expression and translation of the signals of FIG. 49 into decimal numerals according to the multi-valued data elements represented by the signals.

FIGS. 49 and 50 show examples of blocks of data formed from signals, wherein each signal represents a multi-valued data element. In FIG. 49, the first three data blocks from left to right, are identified as F1, F2, and F3, wherein each data block comprises a group of signals that form the block of data, i.e., a multi-valued plural unit. Though 0's are shown in the signal groups in FIG. 49 for comparison with binary notation, they are unnecessary in practice.

FIG. 50 illustrates a preferred method for expression and translation of the signals of each data block in FIG. 49 into decimal numerals according to the multi-valued data elements represented by the signals.

The symbol Sn stands for a particular signal in each data block, where n is the number of the signal without counting 0 (zero). In this situation, n=3 at maximum as each signal group includes a total of four different signals.

Ln stands for the number of levels necessary to sense and discriminate between all of the employed signals. In this situation, as n=3 at maximum, at least three levels, L1, L2, and L3 are needed.

(n+1) means the number of signals employed, including 0, as the set of arithmetic numerals that contain 0. Here n+1=4.

The signals in each data block in FIG. 49, are placed in order, and each signal is assigned its ordinal numeral in its respective block, say 0, 1, 2, 3. The blocks also are assigned their ordinal numbers, in this case, F1, F2, F3, . . . Fm.

FIG. 50 shows the manner of expressing numerals using the signals in FIG. 49.

First, raise 4 (=3+1) to the (m−1)th power block by block, successively, by replacing m with the ordinal number of the block. Then, in each block, multiply the above result by the ordinal number of each signal. The latter result is the numeral for which each signal stands for.

Thus, in the first block F1, m−1=0 (as m=1), so $4^{(m-1)} = 4^0 = 1$. As 1×1=1, the first signal in F, counting from right to left, stands for the numeral 1. In the same way, the second for 2, and the third for 3.

In F2, the first signal stands for 4 (as m=2, $4^{(m-1)} = 4^1 = 4$, and 4×1=4), the second for 8, and the third for 12.

The numerals for which each of the three signals in F3 stand for are, similarly determined to be 16, 32, and 48.

The following table shows the preferred method for expressing some characters and numerals using the signals:

| Characters | Numerals | Block F1 | | | Block F2 | | | Block F3 | | |
|---|---|---|---|---|---|---|---|---|---|---|
| a | N | 1 | 2 | 3 | 4 | 8 | 12 | 16 | 32 | 48 |
| b | 1 | 1 | | | | | | | | |
| c | 2 | | 2 | | | | | | | |
| d | 3 | | | 3 | | | | | | |
| | | 1 | + | 2 | | | | | | |
| e | 4 | | | | 4 | | | | | |
| f | 5 | 1 | + | | 4 | | | | | |
| g | 6 | | 2 | + | 4 | | | | | |
| h | 7 | | | 3 | + | 4 | | | | |
| i | 8 | | | | | 8 | | | | |
| j | 9 | 1 | + | | | 8 | | | | |
| k | 10 | | 2 | + | | 8 | | | | |
| l | 11 | | | 3 | + | 8 | | | | |
| m | 12 | | | | | | 12 | | | |
| n | 13 | 1 | + | | | | 12 | | | |
| o | 14 | | 2 | + | | | 12 | | | |
| p | 15 | | | 3 | + | | 12 | | | |
| q | 16 | | | | | | | 16 | | |
| r | 17 | 1 | + | | | | | 16 | | |
| s | 18 | | 2 | + | | | | 16 | | |
| t | 19 | | | 3 | + | | | 16 | | |
| u | 20 | | | | | | 4+ | 16 | | |

-continued

| Characters | Numerals | Block F1 | | | Block F2 | Block F3 |
|---|---|---|---|---|---|---|
| v | 21 | 1 | + | | 4+ | 16 |
| w | 22 | | 2 | + | 4+ | 16 |
| x | 23 | | | 3 + | 4+ | 16 |
| y | 24 | | | | 8+ | 16 |
| z | 25 | 1 | + | | 8+ | 16 |

As in the case of 3 in the above table suggests, there can be plural additions to express the same numeral. To avoid such a case, it is necessary to establish the following rule: the addition must be done in order of magnitude, starting with the largest number first. If the addition is done starting with the smallest number first, many numerals must be added to reach the numeral in question. This is true, too, of the case where the addition starts with a middle numeral first, though it is certain that fewer numerals are required than those in the foregoing case.

It is essential to the present invention that order is given to all the employed signals and all operations are carried out on the basis of their ordinal numbers.

This invention includes the following four formulae:

(1) Formula to express a numeral which a signal at a bit represents;
(2) Formula to express a numeral which a combination of some signals at different bits represent;
(3) Formula to express the largest numeral which all the employed signals can represent; and
(4) Formula to determine the ordinal number of each signal employed.

Formula (1):

$$S=(n+1)^{m-1} \times N_0,$$

where $1 \leq N_0 \leq n$, and:

S is the numeral to be expressed by one signal;
n is the number of all the employed signals;
m is the ordinal number of the bit; and
$N_0$ is the ordinal number of the signal.

Formula (2):

$$T=(n+1)^0 N_1 + (n+1)^1 N_2 + (n+1)^2 N_3 + \ldots (n+1)^{k-1} N_k,$$

where $1 \leq N_0 \leq n$, the ordinal number of the signal differs at each bit, and:

T is the numeral to be expressed by some signals at different bits; and
k is the number of all the bits used in the operation Formula (3):

where $T_{max}$ is the largest numeral to be expressed by all the signals.

Formula (4):

To determine the ordinal number of each signal, first determine k so as to satisfy $$(n+1)^{k-1} \leq T < (n+1)^k,$$

where k is the number of bits necessary for expression of the numeral T.

Then divide T by $(n+1)^{k-1}$. The quotient is $N_k$, i.e., the ordinal number of the signal at the k'th bit. Confirm that $1 \leq N_k \leq n$.

Similarly, continue the division of the rest of the preceding division successively, getting the ordinal number of the signal at the corresponding bit, until you get $N_1$.

FIG. 51 expresses decimal notation of everyday arithmetic with nine signals. FIG. 51 also illustrates the ease by which the number of meanings can be increased by using a small number of signals. If any kinds of five changes are made among the nine signals, about 5000 new meanings can be produced, though the total number of signals required remains at nine. Examples of changes, include replacement of a signal by a new one, change of the order of two signals, and etc.

Figure 52:
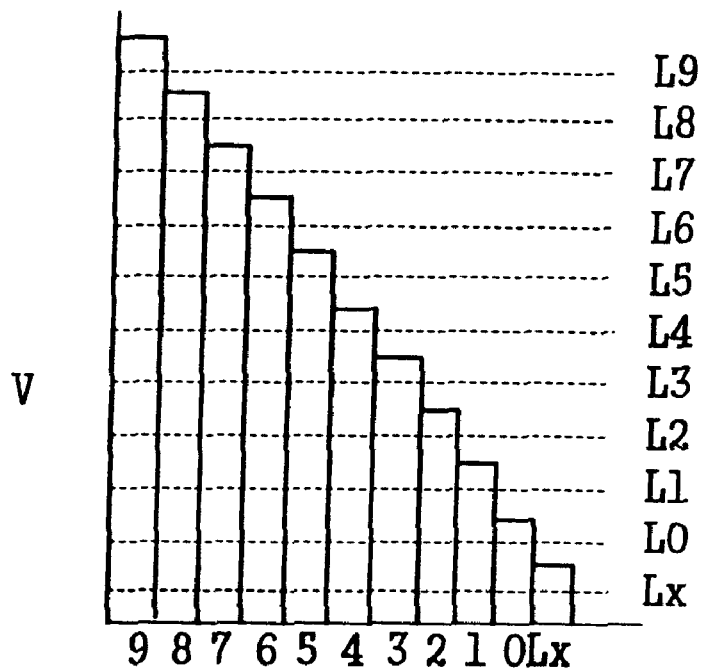
FIGS. 52 illustrates examples of multisignal single units in the form of rectangular pulses.
Figure 53:
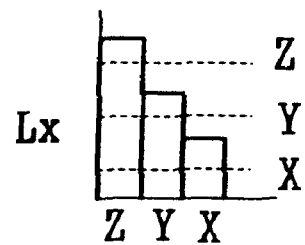
FIG. 53 illustrates signals for indicating the kind of data in FIG. 52.

FIG. 52 illustrates examples of multisignal single units in the form of rectangular pulses for ease of understanding. Ten units can be used together as data signals. Lx in FIG. 53 is a signal to indicate the kind of data in FIG. 52. This relationship can be used for multiplex communication in data transmission, large-scale transmission, designs for a three-dimensional matrix, and etc.

Figure 54:
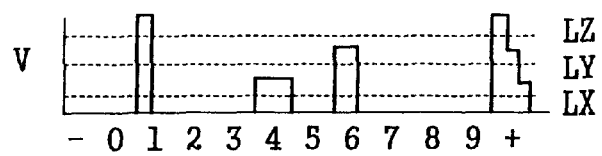
FIG. 54 shows twelve multisignal single units.

FIG. 54 shows twelve signals, each signal being a multisignal single unit, with zero through nine expressing data only. In this case, the order of priority is given: LX<LY<LZ. The level of one is LZ; that of six, LY, and that of four, LX.

The signal corresponding to the positive sign indicator (+) in FIG. 54, means that ten should be added to the value associated with the various levels of the signal. The signal at the positive symbol indicator includes a level corresponding to LZ, therefore ten should be added to the data for LZ, which is one, resulting in a value of eleven in this situation. The signal at the positive sign indicator includes a level corresponding to LY, showing that ten should be added to the data for LY, which is six, resulting in a value of 16. Finally, the signal at the positive sign indicator includes a level corresponding to LX, meaning that ten should be added to the data for LX, which is four, resulting in a value of 14. If the signals were at the negative sign indicator, subtraction of ten would instead be performed.

Figure 55:
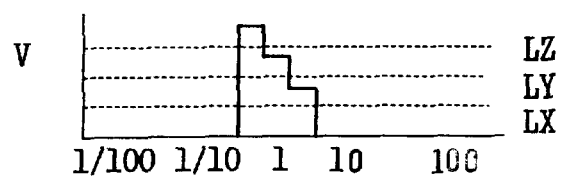
FIG. 55 shows multisignal single units to instruct a multiplication indicated by width.

Similarly, FIG. 55 shows multisignal single units to instruct a multiplication indicated by width. In this case, the instruction is to multiply LX, LY, and LZ by one. Signals at the positive and negative symbol indicators (−) or (+) in FIG. 55, are used in connection with the unit in FIG. 54. The multiplication factor depends on the width of the signal at the positive or negative sign indicator.

Figure 56:
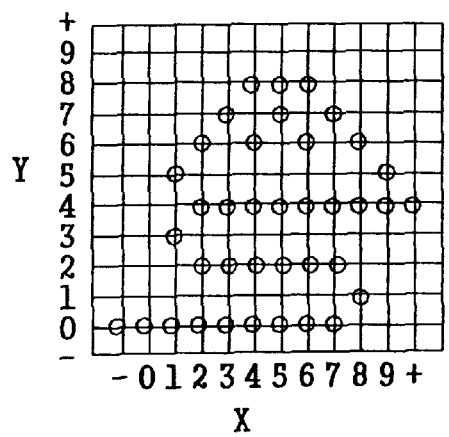
FIG. 56 is a picture of Mt. Fuji drawn with multisignal plural units.

FIG. 56 is a picture of Mt. Fuji with a cloud, for example, drawn in a multisignal plural unit composed of twelve multisignal single units, each containing twelve signals. This plural unit can be used for a memory for display, an electric bulletin board, designs, electro-optical transmission, and etc. Signals at the positive and sign indicators indicate the addition and subtraction of ten for subsequent or proceeding data values, as may be applicable.

Figure 57:
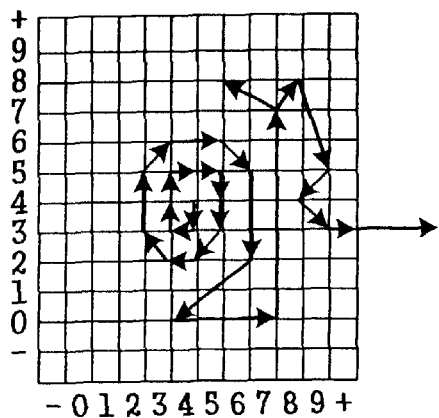
FIG. 57 is picture of a biotechnological locus using multisignal plural units to draw vectors.

FIG. 57 is a picture of a biotechnological locus like that of human brain for example, using a multisignal plural unit by drawing vectors as if tracing the movement of a dot. The plural unit can be used in various ways to express various phenomena. Again, signals at the positive and sign indicators indicate the addition and subtraction of ten for subsequent or proceeding data values, as may be applicable.

The conventional method to express such phenomenon is to indicate a set of four numbers (the ordinal number of the data, X, Y, Z), one after another, but a number as one of these four elements often remains unchanged. This is just the place where multisignals are the most suitable. Biomemory and electro-optical transmission are also such places.

For wireless data communication, the conventional binary system uses a single square pulse of a carrier wave as a code pulse, which represents data as a "1." In comparison, the present invention uses various kinds of signals in place of a single square pulse for "1," i.e., the multisignal system of this invention. In the multisignal system, the necessary number of signals, which differ from each other in height, width, duty, frequency, waveform, and etc. are chosen and combined and used as code signals.

The carrier wave of this invention needs fewer bits than in the binary system. So for the same amount of transmission time as with the binary system, the frequency of the carrier wave does not need to be as high. Thus, the carrier-signal ratio is smaller in this invention, which enables the signal wave to have a higher frequency.

FIG. 58 explains a set of signal blocks relating to this invention (information signals which follow the code signals are omitted here). In particular, FIG. 58 shows signals transmitted by a sending device. First a code block composed of seven bits of multi-valued data elements, then an information block 82, here expressed in a single pulse for simplification, have been sent.

The code block is seven bits of pulses with the peak levels L1, L3, L5, L2, L1, L4, and L6. However, changing the peak level is not the only way to get a special multisignal pulse, changes of width, duty, frequency, waveform, and etc. also suffice. The signals have been sent via radio wave.

FIG. 59 expresses the signals received at the receiving device. The start signals and the end signals, though received, are not drawn here. Shown here is the regenerated code block. This code is stored in the receiving device, and when the next code is transmitted, it is compared with the stored one to recognize it.

The level of the start pulses sent from the sending device indicates the standard output level of an auto gain control circuit. The code is shown as a, b, c, d, e, f, and g.

FIG. 60 illustrates the received code signals sensed as pulses at each level from L1 to L6. These are stored first, then compared with the next received signals. If they are recognized to be the same, only then are the information signals output.

FIG. 61 is a block of the information signals expressed here in a single pulse.

Figure 62:
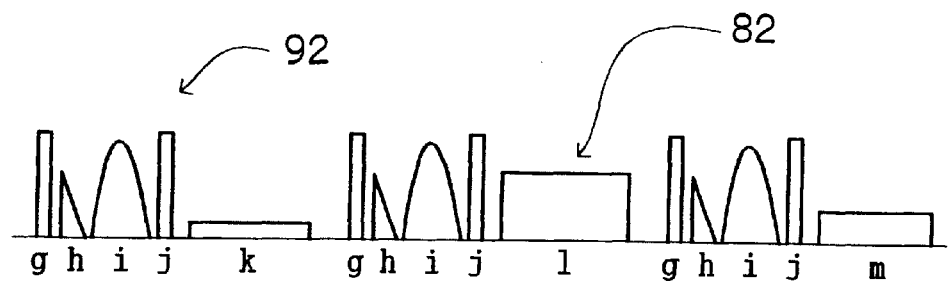
FIG. 62 shows serial sets of code and information blocks that have been sent out continuously from a sending device.

In FIG. 62, the encoded start signals and the encoded end signals are omitted. Here, several such sets of signals shown, each having a different information block, to cope with changing information.

In particular, FIG. 62 shows serial sets of a code block and an information block, which have been sent out continuously from the sending device. The code signals are repeated before every block of the information signals. Signals that represent ever-changing information are divided into blocks.

Figure 63:
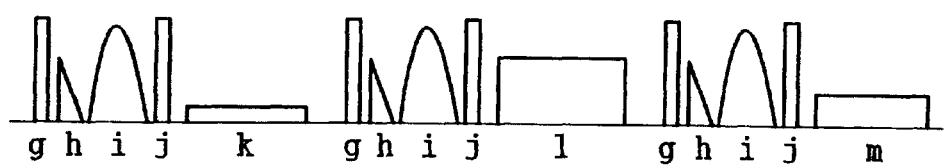
FIG. 63 is the serial sets of signals received by a sending device.

FIG. 63 shows the serial sets of signals received by the receiving device. The device catches the start signals that have been sent repeatedly from the sending device, and receives the code signals and information signals after they have been modified by an auto gain control. The start and the end signals are omitted in the drawing figure.

Figure 64:
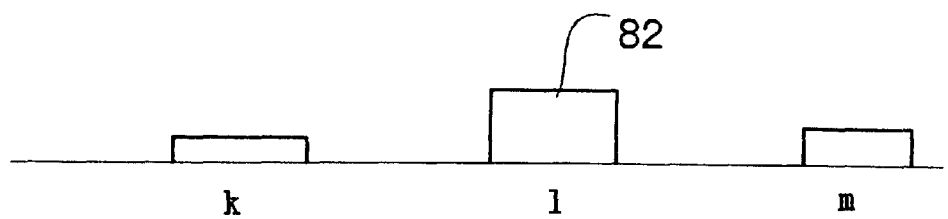
FIG. 64 shows separated information signals.

FIG. 64 expresses the information signal blocks. The code signals are compared with the ones that have been sensed by levels and previously stored. If they are recognized to be the same, they are erased, leaving only the information blocks.

Figure 65:
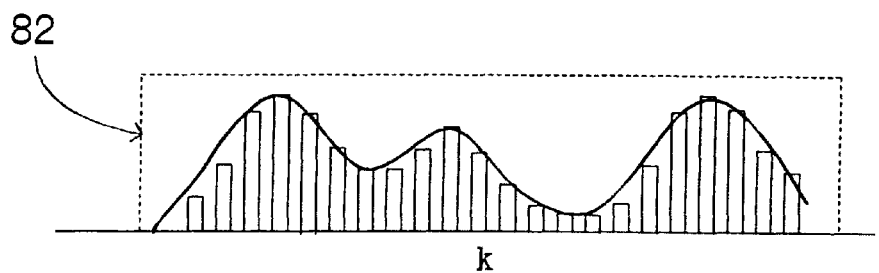
FIG. 65 shows original information signals.

FIG. 65 illustrates an information signal block that has been transmitted. It is these signals shown here that make near perfect sounds and etc.

Figure 66:
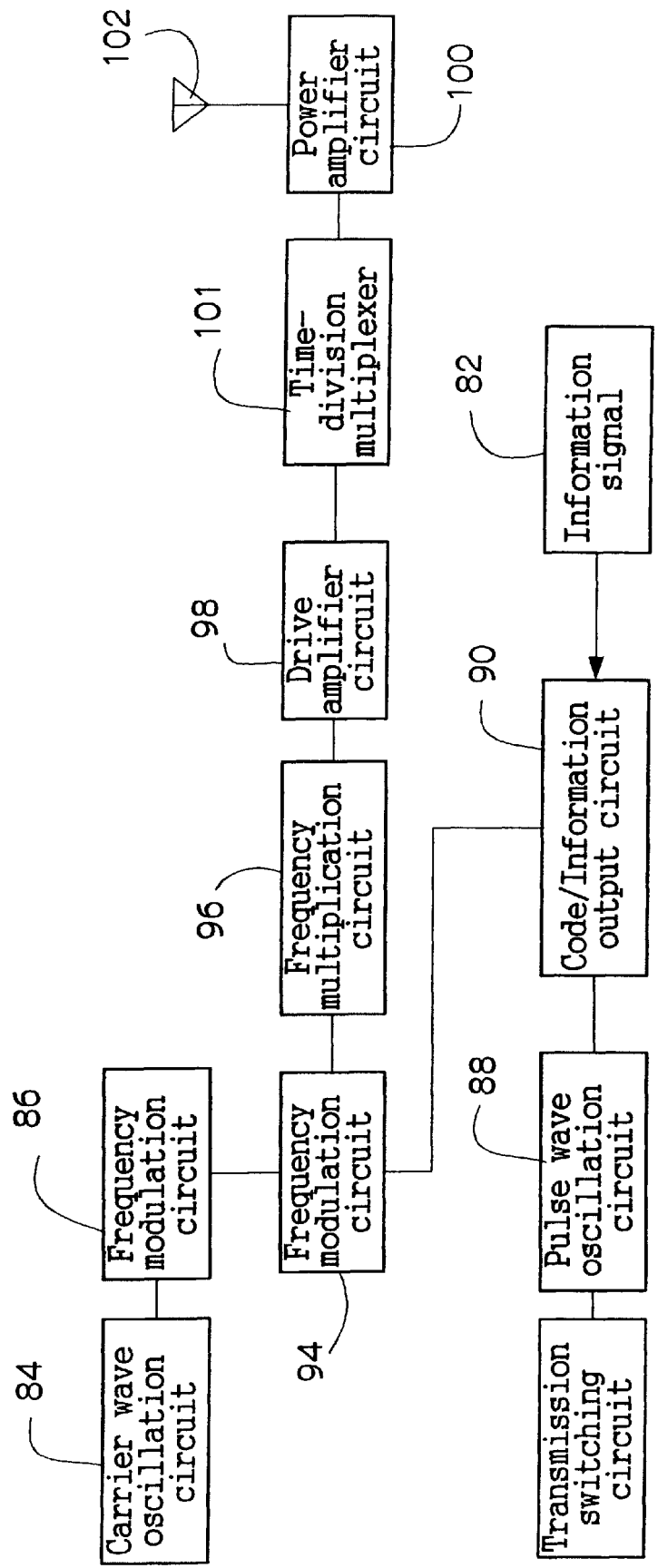
FIG. 66 is a block diagram of a sending device.

FIG. 66 shows examples of circuit block diagrams for transmission devices in accordance with the present invention.

Specifically, FIG. 66 is a diagram of circuit blocks for the sending device. An oscillation circuit 84 generates a carrier wave (frequency $f_1$) and sends it to a frequency modulation circuit 86, while a pulse oscillation circuit 88 generates a pulse wave (frequency $f_2$). The pulse wave is sent to a code/information output circuit 90 composed of a counter, ROM, and etc. This circuit sends the code signals 92 and information signals 82 shown in FIG. 62, which are composed of not only conventional pulses, but also multi-valued data elements with various levels, widths, and etc., to a frequency modulation circuit 94 in FIG. 66.

Through the frequency modulation circuit 94, the code signals and information signals are encoded on the carrier wave from the frequency modulation circuit 86. The frequency is then multiplied at a frequency multiplication circuit 96 and is driven at a drive amplifier circuit 98. Its power, too, is amplified at a power amplifier circuit 100. And then the wave is sent out through an antenna 102.

However, the information signals 82 may be common ones, and are sent out after compression, using a time-division and/or a multiplex system 101.

Figure 67:
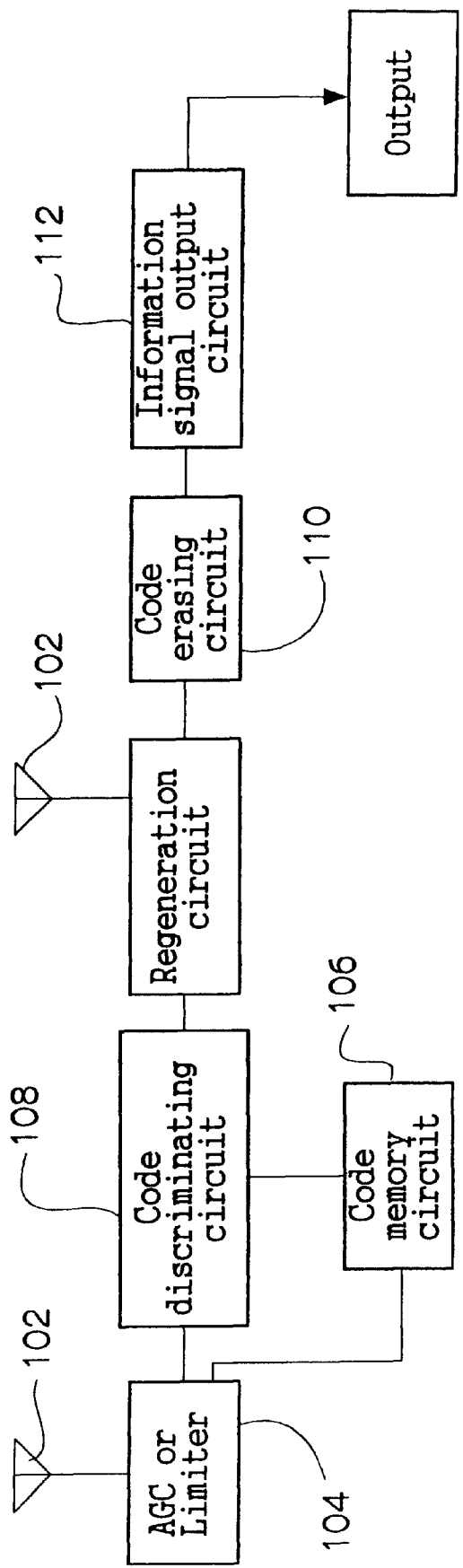
FIG. 67 is a block diagram of a receiving device.

FIG. 67 is a diagram of circuit blocks for a receiving device. The carrier wave is received through an antenna 102. Only the necessary frequency is led to a bypass circuit. The voltage of the signal wave is fixed through an auto gain control (AGC) or limiter 104.

The code signals are recorded in a code memory circuit 106, which stores level-sensed signals. When the next code signals arrive and are level-sensed, they are compared with the previously stored signals at a code discrimination circuit 108. If both codes are recognized to be identical, a code erasing circuit 110 erases the code signals. Hence, only necessary information signals are taken out through an information signal output circuit 112. Then a reproducing circuit (omitted here) reproduces the original information.

Devices in accordance with the invention allows greater use of a given frequency for transmitting data. Applications include wireless radio transmission of data, cellular telephones, pagers, positioning systems for aircraft and sea vessels, hospital-patient interactions, elevator monitoring systems, communications between automobiles and traffic controlling equipment, television-phones, mountain climbing communication gear, the Internet, disaster communication systems, crime prevention systems, measuring devices, controlling equipment, robotics, and other devices.

Various circuits for using signals according to the invention can be designed. It would be most preferable to produce the circuits as ICs.

Experimental results have shown that media recorded according to the current invention can be stored for extended times and has good weather resistance. Therefore, information recorded in the medium can be read accurately, and the media can be used repeatedly without being damaged. This invention makes it possible to record larger volumes of information in high density, and to write and read-out at high speed. In this invention, input information can be rapidly recorded and reproduced. Further, one can randomly access and read out information. Because of these advantages, this invention is very effective at meeting a variety of data storage and recovery needs.

This invention has a wide range of industrial applications, which include an ATR, a VTR, a DAT, a D-VTR, a magnetic disk apparatus for computers, a personal computer, a word processor, goods dealing, a card, the Internet, etc.

What is claimed is:

1. A method for transmitting data, the method comprising the steps of:

(a) selecting a notation system for representing data, with the notation system including digits that include at least three values for each digit;

(b) encoding the data in a signal train by varying a parameter of the signal in accordance with the notation system to represent values of the data as expressed in the notation system;

(c) impressing the encoded data on a carrier wave, and repeatedly transmitting the carrier wave with the data in block format that includes code signals;

(d) receiving the carrier wave and decoding the data therefrom and recording the decoded data;

(e) comparing subsequently transmitted data with recorded data, and indicating valid data received only if blocks or code signals are recognizable to be the same; and (f) at least one of reading and writing data using magnetization intensity levels for data recording locations on recording media for indicating the value of a digit of data recorded at each location, wherein the magnetization intensity levels corresponding to at least any three of the group consisting substantially of an erased state, a partially magnetized state, a fully magnetized state and a state including magnetization spins all aligned the same.

2. A method for transmitting data, the method comprising the steps of:

(a) selecting a notation system for representing data, with the notation system including digits that include at least three values for each digit;

(b) encoding the data in a signal train by varying a parameter of the signal in accordance with the notation system to represent values of the data as expressed in the notation system;

(c) impressing the encoded data on a carrier wave, and repeatedly transmitting the carrier wave with the data in block format that includes code signals;

(d) receiving the carrier wave and decoding the data therefrom and recording the decoded data;

(e) comparing subsequently transmitted data with recorded data, and indication valid data received only if blocks or code signals are recognizable to be the same; and (f) at least one of reading and writing data using at least three optical patterns for data recording locations or recording media, the optical patterns being distinguishable from one another based on at least one size and shape extending substantially along the plane of the recording media.

3. The method of claim 2, wherein the step of least one of reading and writing data includes both reading and writing data, with writing performed by subjecting the recording medium to a laser beam and for generating optical patterns thereat.

4. The method of claim 3, wherein the recording media comprises a material amorphizable and crystallizable, and writing data on the recording media includes subjecting the recording media at recording locations for recording data to a laser beam at a first power level and crystallizing the recording media at recording locations; and subjecting the recording media at recording locations to a laser beam at a second power level and amorphizing the recording media thereat prior to rewriting data at that recording location.

5. A method for using multi-valued data elements, the method comprising the steps:

(a) defining a number of selectively variable magnetization intensity levels for data recording locations on recording media, the defined selectively variable magnetization intensity levels corresponding to at least any three of the group consisting substantially of an erased state, a partially magnetized state, a fully magnetized state and a state including magnetization spins all aligned the same;

(b) selecting a notation system comprising digits that include a number of different possible values for each digit, with the total number of possible values for each digit corresponding to at least three of the selectively variable magnetization intensity levels defined for each data recording location;

(c) uniquely associating each possible value of the digits to a different selectively magnetization intensity level defined for each recording location; and (d) recording the data on the recording media in a format in accordance with the notation system, by adjusting the magnetization intensity level of data recording locations where a digit of the data is recorded on the recording media.

6. The method of claim 5, wherein the step of recording data includes the sub-steps of:

(a) encoding the data in a signal train by varying a parameter of the signal in accordance with the notation system to represent values of the data as expressed in the notation system; and (b) permeating data recording locations on the recording medium with a magnetic flux according to the signal train.

7. The method of claim 6, wherein encoding the data in a signal train includes voltage pulses comprising at least one of pulse height and width varied in accordance with the notation system to represent values of the data.

8. The method of claim 7, wherein the pulses comprise substantially non-rectangular waveforms that vary in at least one of height and width in accordance with the notation system to represent values of the data.

9. The method of claim 5, wherein magnetization intensity of a recording location where a digit of data is recorded, corresponds in level to the value of the digit.

10. A method for using multi-valued data elements, the method comprising the steps of:

(a) defining at least three optical patterns for data recording locations on recording media for selective formation at the data recording locations, the optical patterns being distinguishable from one another based on at least one of size and shape extending substantially along the plane of the recording media;

(b) selecting a notation system comprising digits that include a number of different values for each digit, with the total number of possible values for each digit corresponding to the number of optical patterns defined for each data recording location;

(c) uniquely associating each possible value of the digits to a different pattern defined for each recording location; and (d) recording the data on the recording media in a format in accordance with the notation system, by forming optical patterns at recording locations where a digit of the data is recorded on the recording media.

11. The method of claim 10, wherein the step of recording data includes the sub-steps of:

(a) encoding the data in a signal train by varying a parameter of the signal in accordance with the notation system to represent values of the data as expressed in the notation system; and (b) subjecting the recording media to a laser beam to form optical patterns at recording locations on the recording media in accordance with data encoded in the signal train.

12. The method of claim 11, wherein encoding the data in a signal train includes voltage pulses comprising at least one of pulse height and width varied in accordance with the notation system to represent values of the data.

13. The method of claim 12, wherein the pulses comprise substantially non-rectangular waveforms that vary in at least one of height and width in accordance with the notation system to represent values of the data.

14. The method of claim 10, wherein the recording media comprises a material that is crystallizable, and the step of recording data on the recording media includes subjecting the recording media at recording locations for recording data, to a laser beam and selectively crystallizing the recording media at recording locations.

15. The method of claim 10, further comprising the step of modifying data recorded on the recording media, by altering the optical patterns of recording locations where data has previously been recorded during the step of recording the data on the recording media.

* * * * *

UNITED STATES PATENT AND TRADEMARK OFFICE
CERTIFICATE OF CORRECTION

PATENT NO. : 6,628,596 B2
DATED : September 30, 2003
INVENTOR(S) : Hirosi Fukuda It is certified that error appears in the above-identified patent and that said Letters Patent is hereby corrected as shown below:

<u>Title page,</u>
Item [30], Foreign Application Priority Data, please delete:
"Mar. 12, 1997 (JP) …………..9-63696" and add:
-- Feb. 12, 1997 (JP) ………….9-63696 --

Signed and Sealed this

First Day of June, 2004

JON W. DUDAS
*Acting Director of the United States Patent and Trademark Office*